(12) United States Patent
Reed et al.

(10) Patent No.: US 7,079,308 B2
(45) Date of Patent: Jul. 18, 2006

(54) SHOCK-WAVE MODULATION AND CONTROL OF ELECTROMAGNETIC RADIATION

(75) Inventors: Evan Reed, Pine Islan, MN (US); Marin Soljacic, Somerville, MA (US); John D. Joannopoulos, Belmont, MA (US); Steven G. Johnson, St. Charles, IL (US); Maksim Skorobogatiy, Brighton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 90 days.

(21) Appl. No.: 10/820,420

(22) Filed: Apr. 8, 2004

(65) Prior Publication Data

US 2005/0030613 A1   Feb. 10, 2005

Related U.S. Application Data

(63) Continuation-in-part of application No. 10/412,089, filed on Apr. 11, 2003, now Pat. No. 6,809,856.

(60) Provisional application No. 60/464,006, filed on Apr. 18, 2003.

(51) Int. Cl.
*G02F 2/02* (2006.01)
*G02F 1/35* (2006.01)

(52) U.S. Cl. ........................................... 359/326
(58) Field of Classification Search ............. 385/10, 385/37, 122; 359/326, 332; 372/21, 22
See application file for complete search history.

(56) References Cited

U.S. PATENT DOCUMENTS

| 5,688,318 | A | 11/1997 | Milstein et al. | 117/1 |
| 6,809,856 | B1 * | 10/2004 | Reed et al. | 359/326 |
| 2002/0021479 | A1 | 2/2002 | Scalora et al. | 359/241 |

FOREIGN PATENT DOCUMENTS

WO   WO 03/087926   * 10/2003

OTHER PUBLICATIONS

"Highly Efficient Frequency Conversion with Time-Dependent Photonic Crystals," Reed et al. Dept. of Physics: Massachusetts Institute of Technology. Feb. 2004.
"Reversed Doppler Effect in Photonic Crystals," Reed et al. *Physical Review Letters*. Sep. 2003. vol. 91, No. 13.

(Continued)

*Primary Examiner*—John D. Lee
(74) *Attorney, Agent, or Firm*—Gauthier & Connors LLP

(57) ABSTRACT

A device for converting frequency of electromagnetic radiation includes a nonlinear medium that forms a moving grating in the nonlinear medium by introducing at opposite ends of the nonlinear medium a first set of electromagnetic radiation having varying frequencies. Electromagnetic radiation is inputted into the nonlinear medium at a first frequency and extracted at a second frequency from the nonlinear medium. The moving grating in the nonlinear medium allows for electromagnetic radiation to be converted into the second frequency.

21 Claims, 17 Drawing Sheets

OTHER PUBLICATIONS

"Color Shock Waves in Photonic Crystals," Reed et al. *Physical Review Letters*. May 2003. vol. 90, No. 20.

"The color of shock waves in photonic crystals," Reed et al. Dept. of Physics: Massachusetts Institute of Technology, no date.

"Photon modes in photonic crystals undergoing rigid vibrations and rotations," Skorobogatiy et al. *Physical Review B*. vol. 61, No. 23. Jun. 2000.

"Rigid vibrations of a photonic crystal and induced interband transitions," Skorobogatiy et al. *Physical Review B*. vol. 61, No. 8. Feb. 2000.

"Time-resolved Spectroscopic Reflection Measurements in Shock-Compressed Materials," Gustavsen et al. *Journal of Applied Physics*. Jan. 1991. vol. 69, No. 15.

"Wavelength Filter and Converter by NDFWM in Strained Quantum Wells," Jiang et al. *International Journal of Infrared and Millimeter Waves*. 2001. vol. 22, No. 3.*

"A steady state solution to four-wave mixing utilizing the SU (2,2) group symmetry with mixed gratings in a Kerr type media," Darbyshire et al. *Optics Communications*. 1995. vol. 117, No. 283-289.*

"Simulation of Terahertz Doppler Wavelength Shifting of Infrared Optical Pulses in an Active Semiconductor Layer," Scherbatko et al. *IEEE Transactions on Microwave Theory and Techniques*. Apr. 2000. vol. 48, No. 4.*

"Tunable and Selective Wavelength Conversion Using Fiber Four-Wave Mixing with Two Pump Lights," Inoue et al. *IEEE Photonics Technology Letters*. Dec. 1994. vol. 6.*

* cited by examiner

Off configuration

On configuration

SHOCK-WAVE MODULATION AND CONTROL OF ELECTROMAGNETIC RADIATION

PRIORITY INFORMATION

This application claims priority from U.S. provisional patent application Ser. No. 60/464,006 filed on Apr. 18, 2003, and is a continuation-in-part of U.S. patent application Ser. No. 10/412,089 filed on Apr. 11, 2003 now U.S. Pat. No. 6,809,856.

This invention was made with government support under Grant No. DMR-9808941 awarded by NSF. The government has certain rights in the invention.

BACKGROUND OF THE INVENTION

The invention relates to the field of photonics and, in particular, to photonic crystals. Photonic crystals are a promising and versatile way to control the propagation of electromagnetic radiation. Nevertheless, very little attention has been given to the effects of non-stationary photonic crystals on electromagnetic radiation propagation. It has been shown that the frequency of light can be changed across a bandgap in a photonic crystal which is physically oscillating. However, the frequency of oscillation is required to be of the order of the bandgap frequency in the photonic crystal. Such oscillation frequencies are impossible for light of 1 µm wavelength.

There is no known non-quantum mechanical way to significantly narrow the bandwidth of a wavepacket by an arbitrary amount and change the frequency of light to an arbitrary amount with high efficiency. Acousto-optical modulators can change the frequency by a part in $10^{-4}$, but larger changes in frequency are desirable for most applications. Non-linear materials can be used to produce large changes in light frequencies with less than perfect efficiency. For example, if light of frequencies $\omega_1$ and $\omega_2$ is shined into a non-linear material, light of frequencies $\omega_1+\omega_2$ and $\|\omega_1-\omega_2\|$ may be produced. In addition to the less than perfect conversion efficiencies of these techniques, the frequencies produced are still limited by the range of input frequencies. Production of an arbitrary frequency is not possible unless an arbitrary input frequency is available. Furthermore, great care must be taken in the design of the device to ensure momentum conservation, which is required for high efficiency. Additionally, high intensities are required, and the frequencies produced are still limited by the range of input frequencies and phase-matching constraints. Using such prior art systems, production of an arbitrary frequency shift in a given system is not possible.

Of additional interest in optical applications is the ability to trap and manipulate pulses of light. Few technologies exist to trap 100% of the energy of a pulse of light for a period of time which is determined while the light is trapped. Existing approaches for trapping light for a pre-specified amount of time require the use of large lengths (kilometers) of optical fiber. The time required for light to propagate through the fiber is a function of the length. A number of large reels of fiber of varied lengths are required to delay light pulses for a range of times, and even then the delay time cannot be determined in real time.

Photonic crystals have been shown to be a versatile way to control the propagation of electromagnetic radiation. However, very little attention has been given to the effects of non-stationary photonic crystals on electromagnetic radiation propagation.

Whatever the precise merits, features, and advantages of the above-mentioned approaches, they fail to achieve or fulfill the purposes of the present invention's system and method for trapping light for a controlled period of time via shock-like modulation of the photonic crystal dielectric.

SUMMARY OF THE INVENTION

According to one aspect of the invention, there is provided a method of modifying frequency of electromagnetic radiation input into a nonlinear medium. The method includes forming a moving grating in the nonlinear medium by introducing at opposite ends of the nonlinear medium a first set of electromagnetic radiation having varying frequencies. Electromagnetic radiation is inputted into the nonlinear medium at a first frequency. Also, the method includes extracting electromagnetic radiation at a second frequency from the nonlinear medium. The moving grating in the nonlinear medium allows for electromagnetic radiation to be modified into the second frequency.

According to another aspect of the invention, there is provided a method of converting frequency of electromagnetic radiation input into a nonlinear medium. The method includes forming a moving grating in the nonlinear medium by introducing at opposite ends of the nonlinear medium a first set of electromagnetic radiation having varying frequencies. Electromagnetic radiation is inputted into the nonlinear medium at a first frequency. Also, the method includes extracting electromagnetic radiation at a second frequency from the nonlinear medium. The moving grating in the nonlinear medium allows for electromagnetic radiation to be converted into the second frequency.

According to another aspect of the invention, there is provided a device for converting frequency of electromagnetic radiation. The device includes a nonlinear medium that forms a moving grating in the nonlinear medium by introducing at opposite ends of the nonlinear medium a first set of electromagnetic radiation having varying frequencies. Electromagnetic radiation is inputted into the nonlinear medium at a first frequency and extracted at a second frequency from the nonlinear medium. The moving grating in the nonlinear medium allows for electromagnetic radiation to be converted into the second frequency.

DETAILED DESCRIPTION OF THE INVENTION

Although the present invention has been shown and described with respect to several preferred embodiments thereof, various changes, omissions, and additions to the form and detail thereof may be made therein without departing from the spirit and scope of the invention.

The effects on electromagnetic radiation propagating in a shocked photonic crystal (consisting of alternating dielectric layers along a particular direction) are considered. Finite difference time domain (FDTD) simulations of Maxwell's Equations in one dimension, single polarization, and normal incidence for a system described by a time-dependent dielectric $\epsilon(x,t)$ are used to explore the phenomena associated with light scattering from a shock-wave, or shock-like wave, in a photonic crystal.

Figure 1:
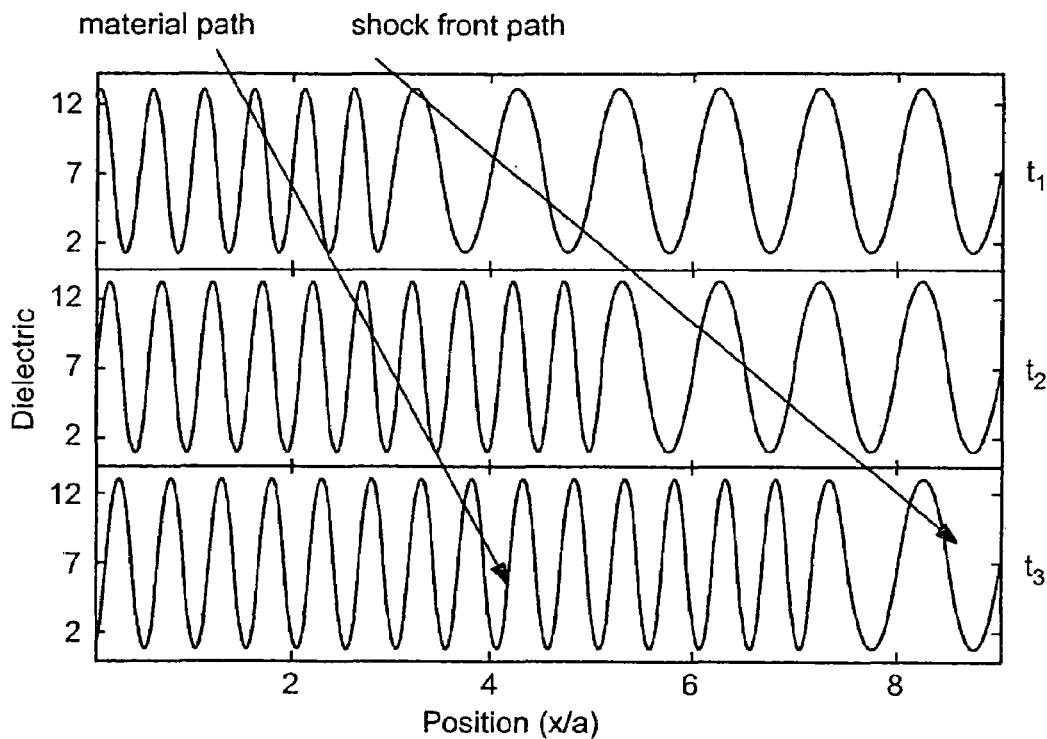
FIG. 1 illustrates a shock wave profile.

A typical shock wave profile is depicted in FIG. 1. It corresponds to the dielectric function given by $$\epsilon\left(\hat{x}=\frac{x}{a}, \hat{t}=\frac{ct}{a}\right) = 6 + 7\sin\left[\pi\left(3\hat{x}-\frac{v}{c}\hat{t}\right)-\frac{\pi}{\gamma}\log\left(2\cosh\left(\gamma\left(\hat{x}-\frac{v}{c}\hat{t}\right)\right)\right)\right], \quad (1)$$

where v is the shock speed and a is the period of the pre-shocked crystal. The photonic crystals on both sides of the shock front have periodic variations of $\epsilon$ ranging from 1 to 13. The thickness of the shock wave front is given by $\gamma^{-1}$, which is 0.05. FIG. 1 describes this shock wave propagating to the right (leaving a compressed lattice behind) in the dielectric described by Equation (1) as a function of position for three equally-spaced instants of time $t_1 < t_2 < t_3$. Arrows follow the shock front and material paths, which move at different speeds. The shocked lattice is identical to the original but with a smaller lattice constant. In this case, the shock wave compresses the lattice by a factor of 2. The interface moves at the shock speed v and the material behind also moves uniformly at a slower speed—known as the particle speed. In this case, the particle speed is v/2. This scenario can roughly be thought of as two different lattice constant photonic crystals moving toward each other.

The shock wave profile of the dielectric constant in the photonic crystal can be generated by a variety of means. One method includes launching a physical shock wave into the photonic crystal using explosive loading, high-intensity lasers or other means. Another method involves the generation of the shock wave profile through the use of materials which change the dielectric constant under an applied electric field or applied change in temperature. Some of these materials can be modulated at GHz frequencies with 1% changes in the refractive index. A generalized idea of a shock wave can be adopted as a dielectric modulation which is steady in a reference frame moving at the shock speed. A time-dependent shock wave profile may be realized by time-dependent modulation of the local dielectric at all points in the system. In addition to a constant shock velocity, a propagation velocity which is time-dependent may provide better results for a particular application. The thickness of the shock wave front may also be varied for desired effect. Other possible ways of producing similar effects in photonic crystals may involve the simultaneous interaction of light with a spinning disk and an object fixed in the laboratory frame. However, the means for producing such shockwaves should not be used to limit the scope of the present invention.

Figure 2:
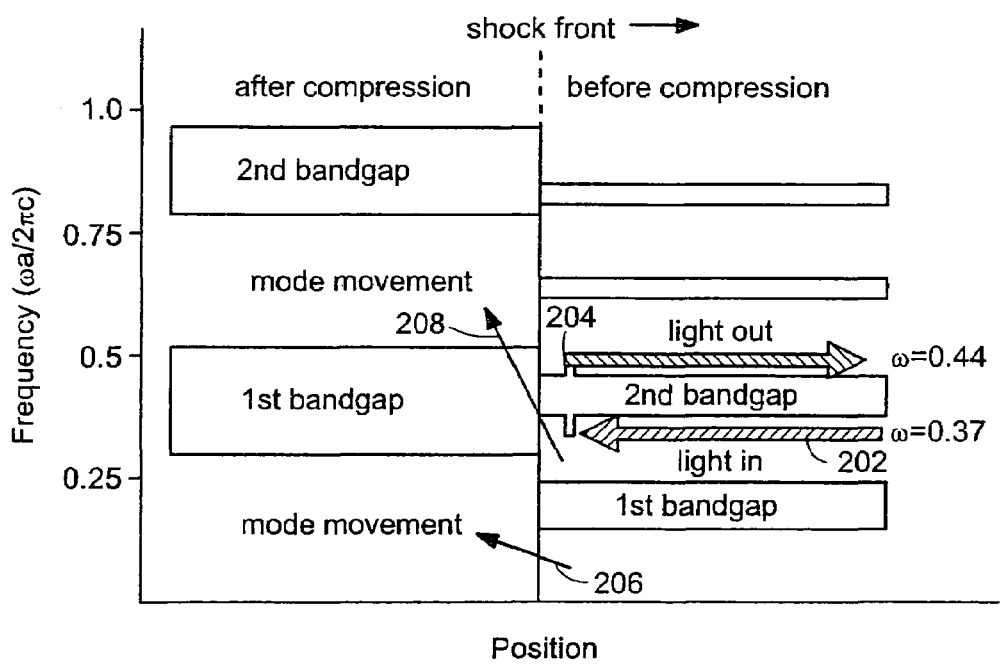
FIG. 2 illustrates bandgaps for the crystals which exist in front of and behind the shock front.

As an illustrative example, the specific case is considered wherein the shock wave compresses the lattice constant behind the shock by a factor of 2. Additionally, the shock front has a thickness on the order of, or less than, a single lattice constant, as depicted in FIG. 1. The bandgaps for the crystals which exist in front of and behind the shock front are depicted in FIG. 2. It should be noted that there is a complete gap which extends over the entire crystal from frequency $\omega_1$ to $\omega_2$.

First, the effect of electromagnetic radiation in the photonic crystal is considered. Electromagnetic radiation is shined into the crystal in the opposite direction of shock propagation (or in a direction that not necessarily the same as that of the direction of shock propagation) just below the second gap at $\omega_1$ (e.g., indicated by arrow 202 for $\omega_1=0.37$) on the right side of FIG. 2. This radiation is converted up in frequency to $\omega_2$ (e.g., indicated by arrow 204 for $\omega_2=0.44$), where it propagates away from the shock and can be extracted from the system near the input. Arrows 206 and 208 indicate the adiabatic evolution of the modes for the lowest two bands.

It should be noted that specific bandgaps (i.e., $1^{st}$ bandgap, $2^{nd}$ bandgap, etc.) are used for illustration purposes only and the present invention equally applies to the use of other bandgaps. Hence, specific bandgaps should not be used to limit the scope of the present invention.

Figure 3:
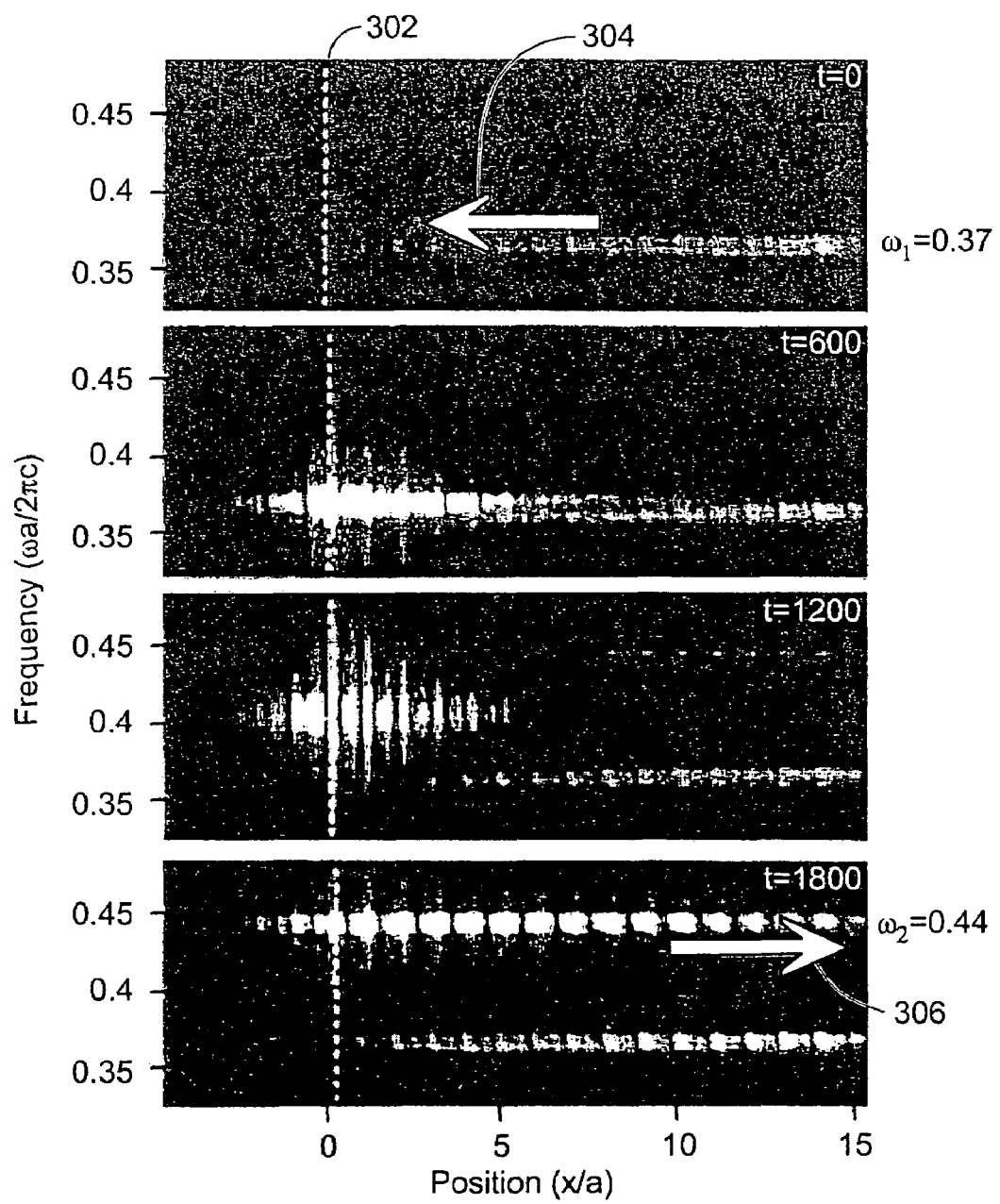
FIG. 3 illustrates four moments in time in a computer simulation of the shock in FIG. 1.

FIG. 3 illustrates four moments in time in a computer simulation of the shock in FIG. 1. For example, FIG. 3 shows the magnetic field for a simulation where the shock front (dashed line) propagates to the right, with $v=3.4\times10^{-4}$ c. It should be noted that the shock front location is indicated by the dotted line 302. The panels in FIG. 3 are obtained by Fourier transforming the magnetic field over windows of time ($\Delta t=200$ a/c) centered at the times shown in the upper right corners. Light is initially spatially contained in a Gaussian distribution centered around x/a=40 at the band edge frequency. As the Gaussian distribution moves and broadens to the left, most of the incident light is trapped in a localized state at the shock front in the overlapping bandgap frequency region of the two photonic crystals. While it is trapped, it evolves up in frequency through the pre-shocked bandgap and is released to the right of the shock, with about 20% change in frequency in this case. More specifically, the light begins the simulation below the gap in the unshocked material at $\omega_1=0.37$ (indicated by arrow 304) and, as the light begins to propagate to the left, most of it is trapped at the shock front until it escapes to the right at $\omega_1=0.44$ (indicated by arrow 306).

It should be noted that the amount of frequency shift in this example can be tuned by adjusting the size of the bandgap of the pre-shocked crystal and, hence, such frequency shift amounts should not be used to limit the scope of the present invention.

The shock wave propagates about 0.5 a in FIG. 3, and this frequency conversion process is observed once for every lattice unit the shock wave traverses, resulting in a pulsed output for a continuous wave input. The pulse rate can be controlled with the shock speed. Qualitatively similar effects were observed for a slower shock velocity of $v=3.4\times10^{-5}$ c.

An additional consequence of this scenario is the localization of light for a controlled period of time. If the speed at which the shock-like interface moves can be controlled, then the light can be confined in the gap region for a time that is determined by that shock speed. It should be noted that the propagation speed of light is near zero while trapped at the shock front, which has useful applications in telecommunications or quantum optics.

Figure 4:
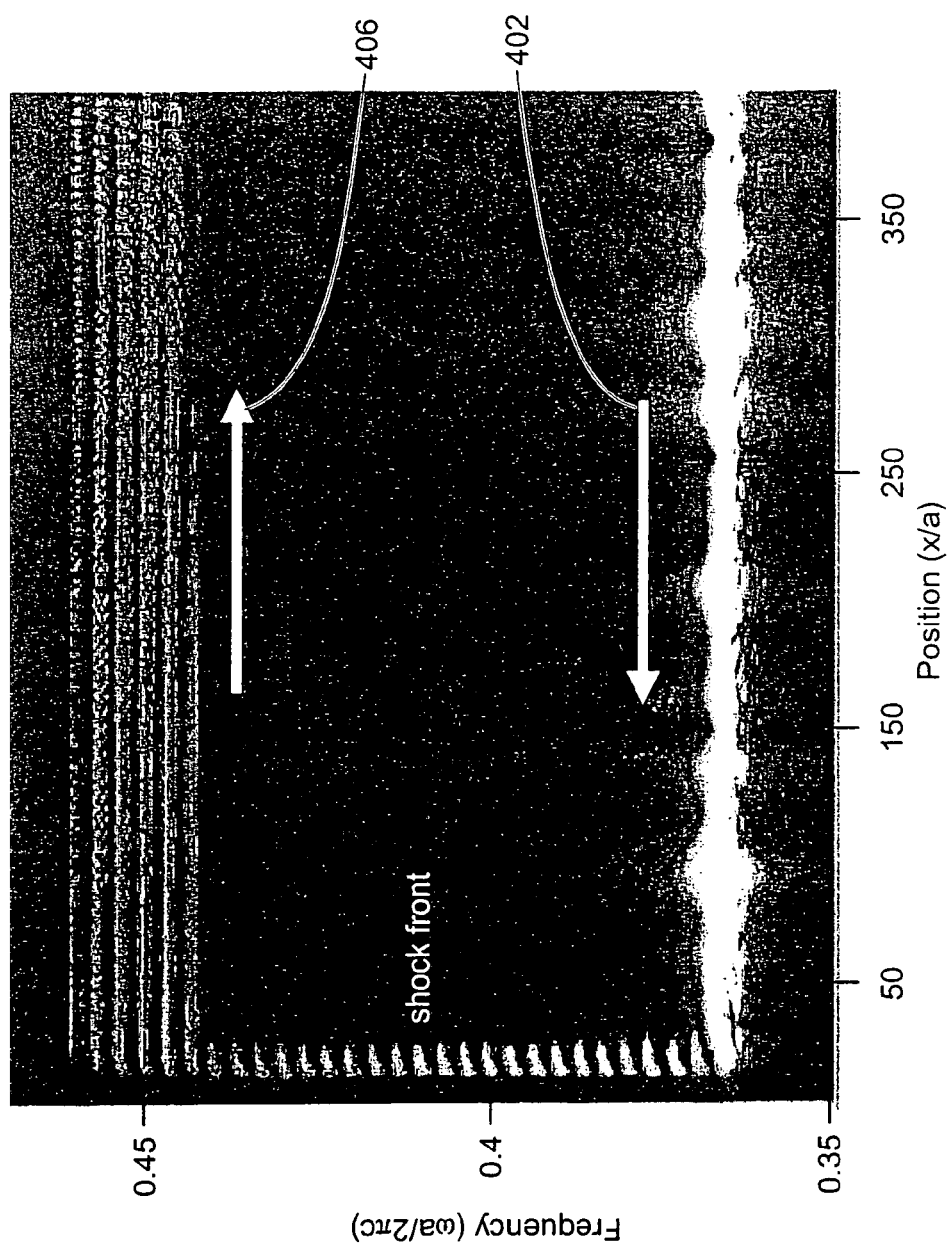
FIG. 4 contains results of a simulation similar to that in FIG. 3, but with a faster moving shock front of $v=3.4\times10^{-3}$ c.

FIG. 4 contains results of a simulation similar to that in FIG. 3, but with a faster moving shock front of $v=3.4\times10^{-3}$ c. The frequencies are separated by $2\pi v/a$. Similar to the example in FIG. 2, light enters at $\omega=0.37$ (shown by arrow 402) below the bandgap and is converted up in frequency at the shock front and propagates away as discrete frequencies around $\omega=0.45$ (shown by arrow 404). Light in this simulation starts out as a Gaussian centered at x/a=220 with the bandgap edge carrier frequency. The Fourier transform of magnetic field which produced this figure utilized a longer time period ($\Delta t=6000$ a/c) than that of FIG. 3 and shows the entire upconversion of light from below the gap to the top of the gap as the shock front passes through several lattice periods. The light trapped at the shock front appears to exist in discrete frequencies and escapes at the top of the gap in such frequencies. This discretization can be loosely interpreted as a result of repeated bounces of the light between the moving material on the left and the fixed material on the right and is commensurate with the periodic nature of the pulsed output. The interpretation of the output light in FIGS. 3 and 4 as equally-spaced discrete frequencies or pulses is a matter of frequency resolution in the detection apparatus.

The frequency of the localized state at the shock front observed in FIG. 3 is well defined in the limit of a slowly propagating shock where $$\frac{d\omega}{dt}<<\omega^2.$$

However, for shock speeds sufficiently fast for this condition to break down, the localized mode possesses an effective bandwidth which is on the order of the bandgap frequency width. FIG. 4 is approaching this regime, where it is almost more appropriate to think of the light continuously moving up through the bandgap rather than in a pulsed fashion as in FIG. 3.

Figure 5:
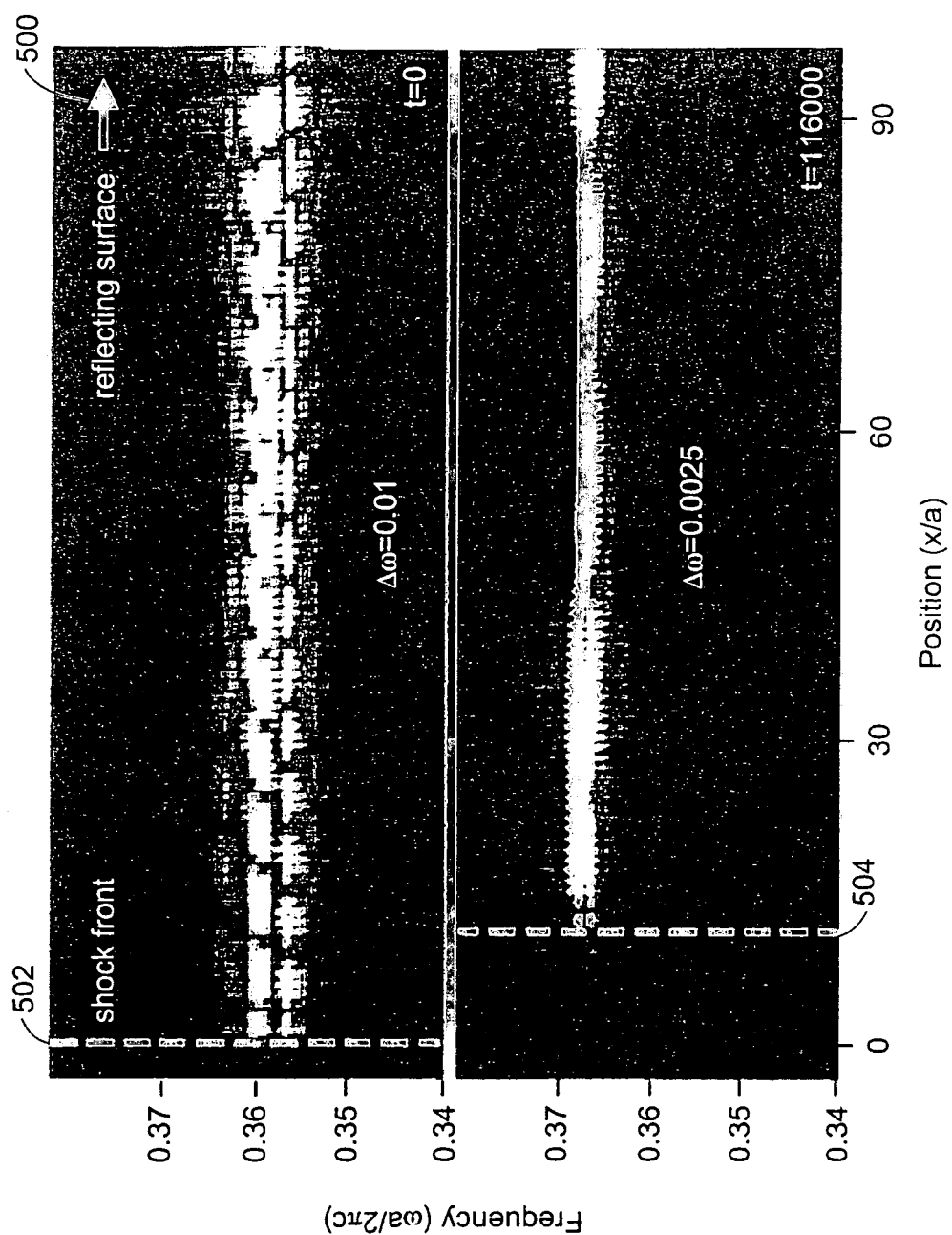
FIG. 5 illustrates the results of a simulation wherein the bandwidth of input light is reduced by a factor of 4.

Additionally, the shock-like dielectric modulation of FIG. 1 is used to narrow the bandwidth of a pulse of light. This is accomplished by confining the light between the moving shock front on the left and a reflecting surface of the right (indicated by arrow 500). FIG. 5 illustrates the results of such a simulation (with the dotted lines 502 and 504 indicate the shock front), where the bandwidth of input light is reduced by a factor of 4 (bandwidth of input light=$\Delta\omega=0.01$ and bandwidth of output light=$\Delta\omega=0.0025$). In this specific example, the shock is moving, with $v=10^{-4}$ c and $\gamma^{-1}=2$. The narrowing process can become more effective for slower shock velocities, larger simulation cells, and narrower initial bandwidths.

Changing the thickness of the shock front has an effect on the frequencies produced and the degree of continuity of the frequency-converted electromagnetic radiation. Continuous frequency conversion is accomplished with a shock wave possessing a front thickness much larger than the lattice spacing. This is depicted in FIG. 6.

Figure 6:
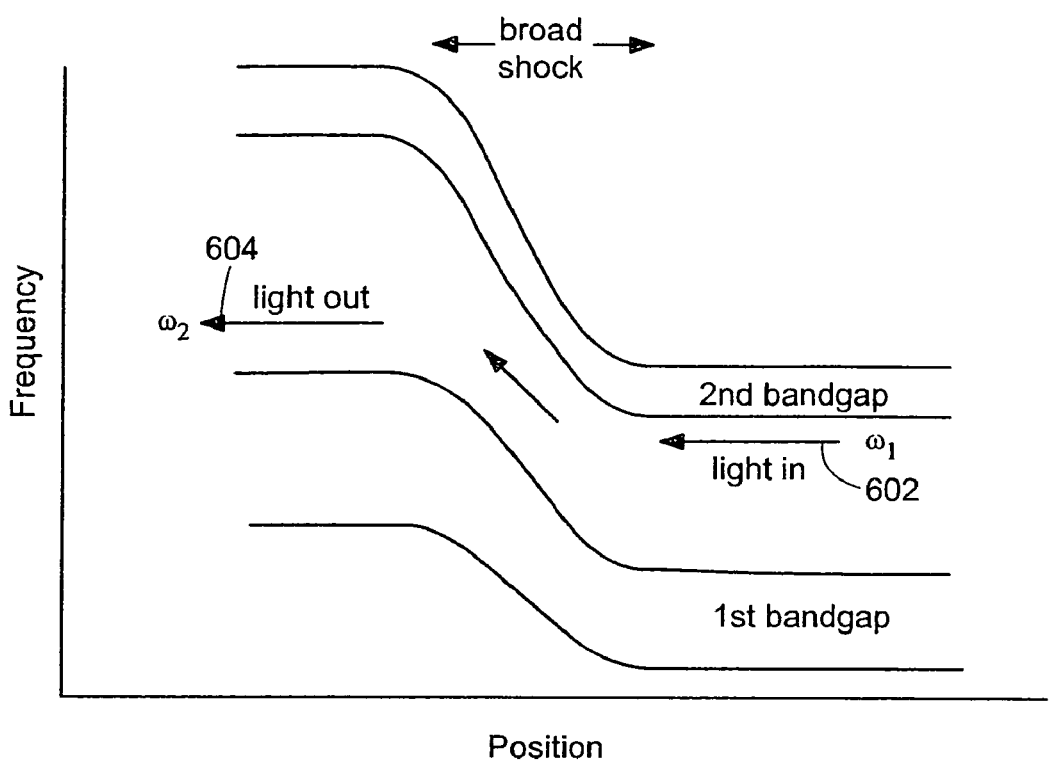
FIG. 6 illustrates a frequency versus position graph of a broad shock wave propagating to the right of a photonic crystal.

FIG. 6 illustrates a frequency versus position graph of a broad shock wave propagating to the right of a photonic crystal. The shock front width is much larger than the lattice constant. A signal input at $\omega_1$ from the right (arrow 602) is coherently converted up in frequency to $\omega_2$ and output to the left (arrow 604). It is also envisioned that coherency may be maintained for small frequency shifts for narrow shocks. It should be noted that running the shock wave in reverse has a frequency lowering effect for light input from the right at $\omega_2$, which is complimentary to the frequency increasing effect described here.

While there are numerous ways to increase the bandwidth of a wave packet, there are currently no classical (non-quantum mechanical) ways to decrease the bandwidth. This can be accomplished through the addition of a photonic crystal mirror on the right side of the system in FIG. 2. If electromagnetic radiation of a range of frequencies below $\omega_1$ is shined into the system, it will be confined between the shock front and the mirror on the right side. As the shock propagates, all this radiation is shifted up in frequency until the lower band edge in the pre-shocked material is reached; then the radiation is shifted up in frequency through the total system gap and can be extracted on the right side.

Many other methods are envisioned to reduce or increase the bandwidth of a pulse of light based upon this configuration. Some of these are related to the frequency dependence of the Doppler shift and the frequency dependence of the adiabatic evolution of the modes. The rate of adiabatic frequency shift of the modes in the pre-shocked material is a function of frequency. Modes close to the bottom of the gap change frequency more slowly than those away from the gap due to the high density of modes there. This may have bandwidth altering applications. It is also possible to vary the frequency width of the bandgap as a function of position in the crystal to control the density of states, as in FIG. 7.

Figure 7:
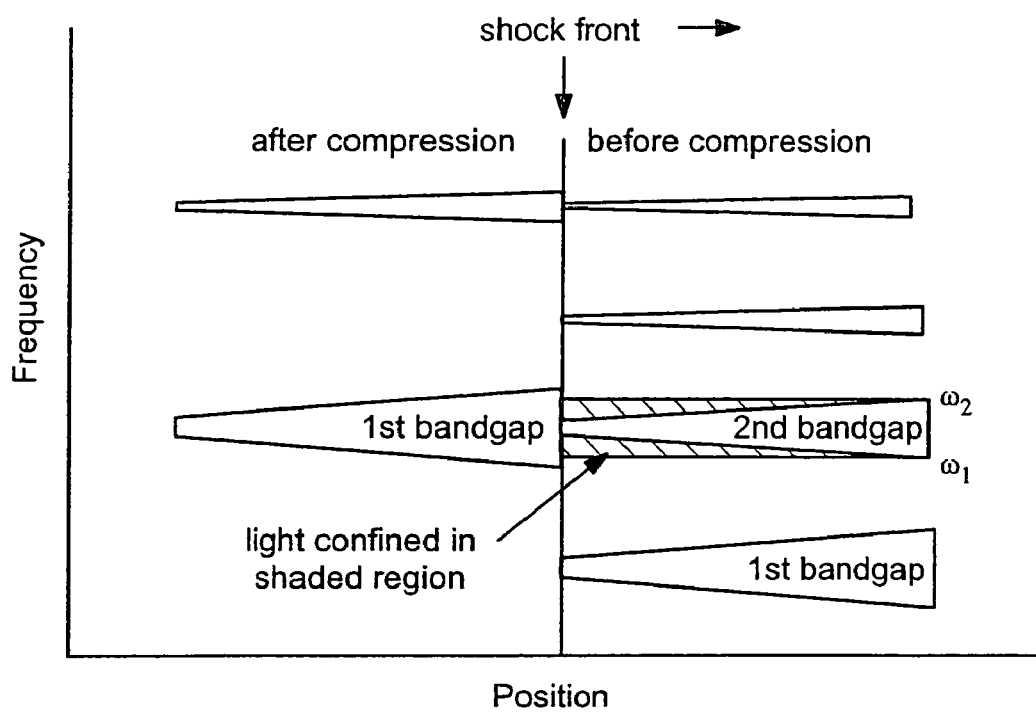
FIG. 7 illustrates a schematic of a shock wave compressing a material with a spatially dependent bandgap.

FIG. 7 illustrates a schematic of a shock wave compressing a material with a spatially dependent bandgap. All light which exists between $\omega_1$ and $\omega_2$ is converted to $\omega_2$ and escapes on the right side. This will decrease the distance the shock wave must travel to convert all the energy in a given bandwidth.

Thus, the use of photonic crystals as frequency-dependent mirrors allows for the confinement of light of certain frequencies, while others are allowed to escape. If the geometry of the photonic crystals is sufficiently slowly altered that the confined light changes frequency slowly, it will all escape at the edge of the confining frequency nearly monochromatically. It should be noted that this effect cannot be accomplished with metallic mirrors due to their lack of significant frequency dependence and rapid absorption of electromagnetic energy.

In addition to frequency changes, the shocked photonic crystal has the capability of trapping light for a period of time in a defect state located at the shock front, as in FIG. 3. While the light is being shifted up in frequency through the gap, it is trapped at the shock front. If the speed of the shock wave can be controlled, then the light in the localized defect state can be trapped there for a controlled time. The light can be released by running the shock forwards or backwards. In the forward case, the light is released at the top of the pre-shocked material gap. In the reverse case, the light is released at the original frequency that it was input. This scheme is an optical pulse delay, which can delay pulses of light "on the fly" by adjusting the shock velocity.

Figure 8:
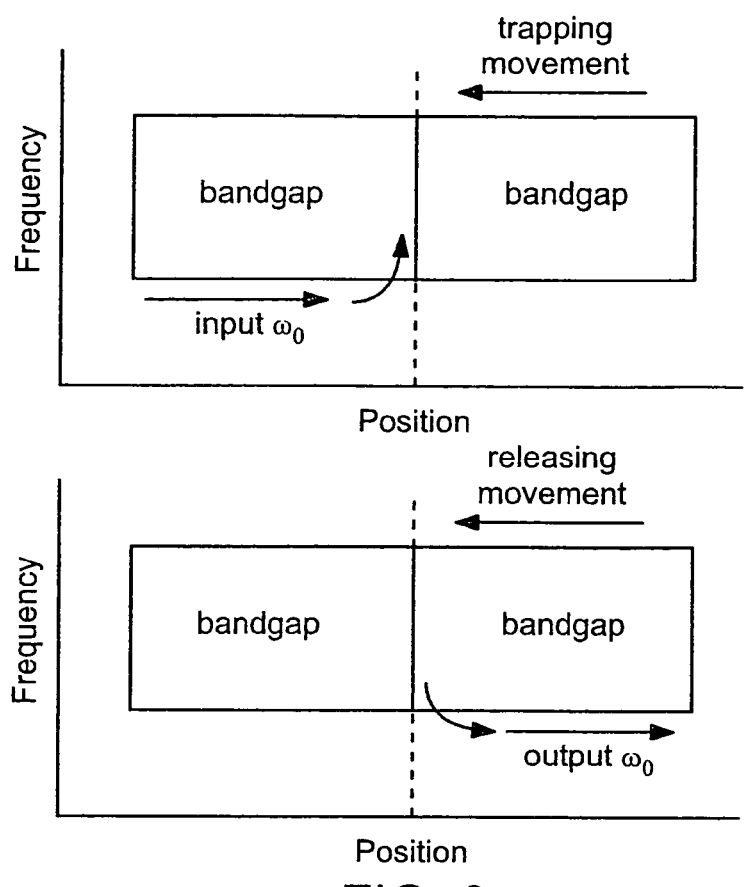
FIG. 8 illustrates a schematic showing how the present invention is used to delay and alter the form of electromagnetic signals.

FIG. 8 illustrates a schematic showing how the present invention is used to delay and alter the form of electromagnetic signals. The electromagnetic trapping effect observed in the shock wave scenario can be generated by a variety of other means. The most obvious is to actually change the distance between two photonic crystals using piezoelectric materials or other means, as in FIG. 1. Another means of generating the appropriate time-dependent effects is through the use of materials which change the dielectric constant under an applied electric field or applied change in temperature. Some of these materials can be modulated at GHz frequencies with 1% changes in the refractive index. Other possible ways of producing similar effects in photonic crystals may involve the simultaneous interaction of light with a spinning disk and an object fixed in the laboratory frame.

Figure 9:
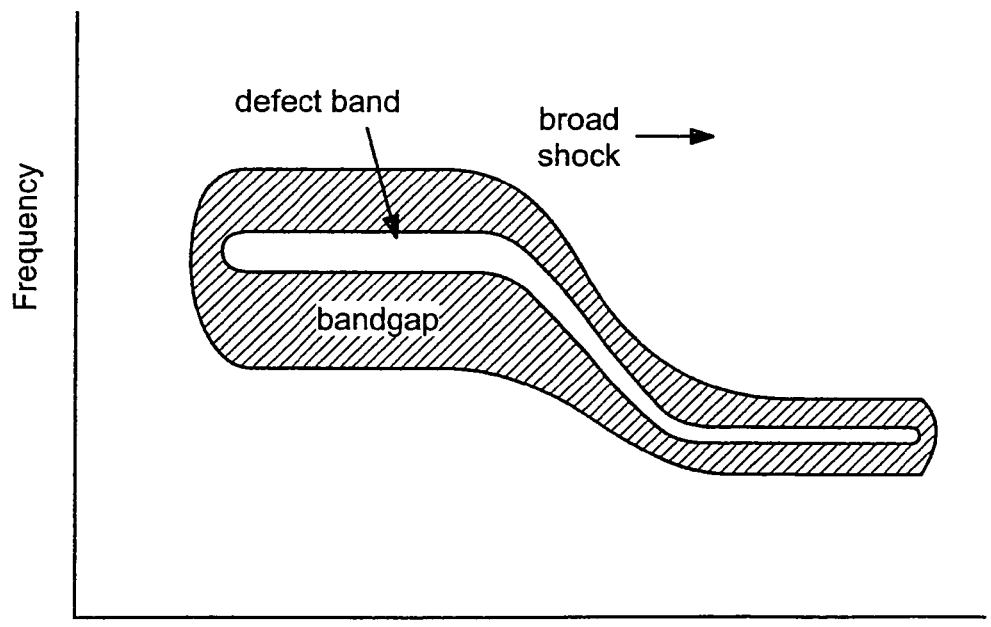
FIG. 9 illustrates a scenario wherein electromagnetic energy is shined into a defect band.

The incorporation of crystal defects and defect bands into the shocked photonic crystal can also have useful properties. For example, consider electromagnetic energy which is shined into a defect band, as depicted in FIG. 9. The shock is propagating to the right and converts all the energy in the defect band up in frequency if the highest group velocity is less than the shock wave speed. If the group velocity of the energy in the defect band is less than the shock speed, then 100% of the energy will be converted in frequency, and can be extracted out the left side in the post-shocked material.

In addition, if the shock wave changes the amount of dispersion in that band, the frequency bandwidth can be changed by the shock wave. For example, if the shock is run in reverse, it will move the crystal defects apart as it propagates. This decreases the amount of dispersion in the defect band and forces all the light in that band to occupy a narrower bandwidth. Slow separation of the defects to infinity will force all of the light into a single frequency.

These ideas apply to any system which is described well by tight-binding. For example, efficient frequency conversion can be achieved in this fashion in a series of coupled inductor-capacitor resonators. If the frequency of the resonators is changed more quickly than the group velocity of the energy in the system, then 100% of the input energy will be converted.

There has been recent interest in nonlinear effects in light trapped in localized states in photonic crystals. The conversion of light from frequency $\omega$ to $3\omega$ can be accomplished more efficiently than usual through the use of such localized states which do not have a well-defined momentum.

It is possible to achieve large amplitudes localized at the shock front. These large amplitudes are a result of the adiabatic compression of an extended state to a localized state. These amplitudes increase with the size of the system and increase as the shock velocity decreases. Amplitudes of several orders of magnitude higher than the amplitude in the pre-shock region are possible.

If the intensity of electromagnetic radiation in the defect state at the shock front is sufficiently high that non-linear material effects become important, then light of frequency $3\omega$ may be generated, where w is the frequency of the defect state. In this case, as the frequency of the light in the defect state changes, so will the $3\omega$ generated by nonlinearities. If $3\omega$ is a frequency which coincides with allowed modes of the system, this light will be able to escape the shock front and propagate away.

In addition to large frequency changes and bandwidth narrowing, it is possible to observe other novel effects in photonic crystals which are modulated in a shock-like pattern. For example, a reverse Doppler shift from a moving boundary in a photonic crystal can be observed using a dielectric of the form $$\varepsilon\left(\hat{x} = \frac{x}{a}, \hat{t} = \frac{ct}{a}\right) = 7 + 3\left[1 - \tanh\left(\gamma\left(\hat{x} - \frac{v}{c}\hat{t}\right)\right)\right]\sin(2\pi\hat{x}). \quad (2)$$

Figure 10:
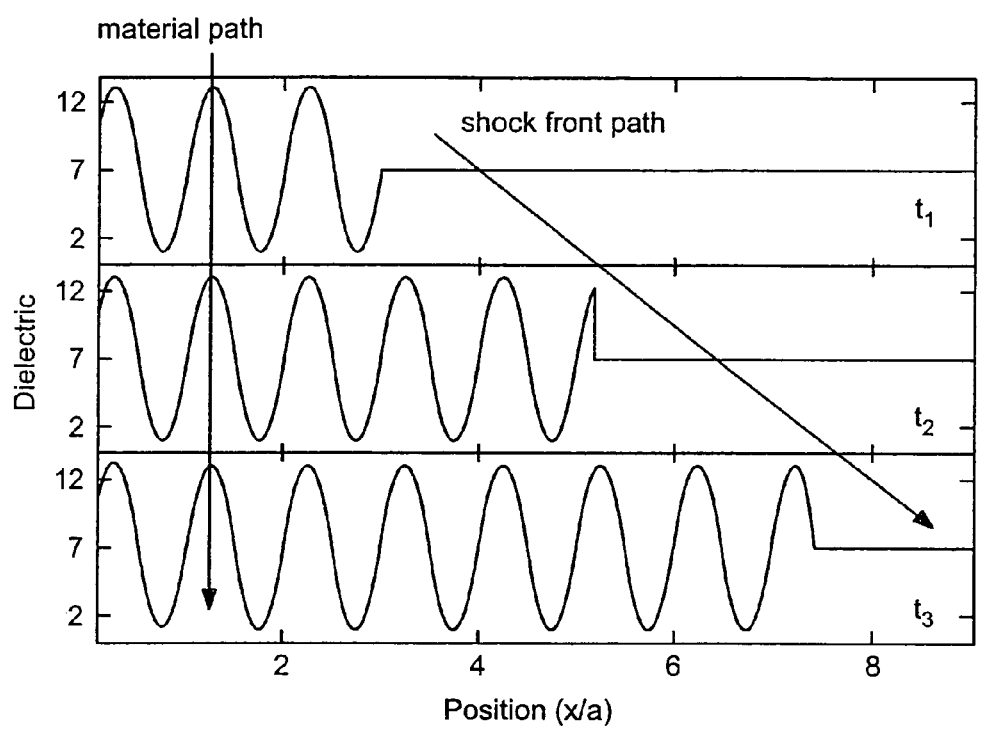
FIG. 10 illustrates a graph of the dielectric as a function of position for three equally-spaced instants of time, $t_1 < t_2 < t_3$.

This is shown in FIG. 10.

FIG. 10 illustrates a graph of the dielectric as a function of position for three equally-spaced instants of time, $t_1 < t_2 < t_3$. Arrows follow the shock front and material paths, which move at different speeds. In this case, a moving interface exists between a photonic crystal and a uniform dielectric medium and the photonic crystal does not move relative to the uniform medium, but movement of the interface causes an expansion or growth of the crystal region.

Figure 11:
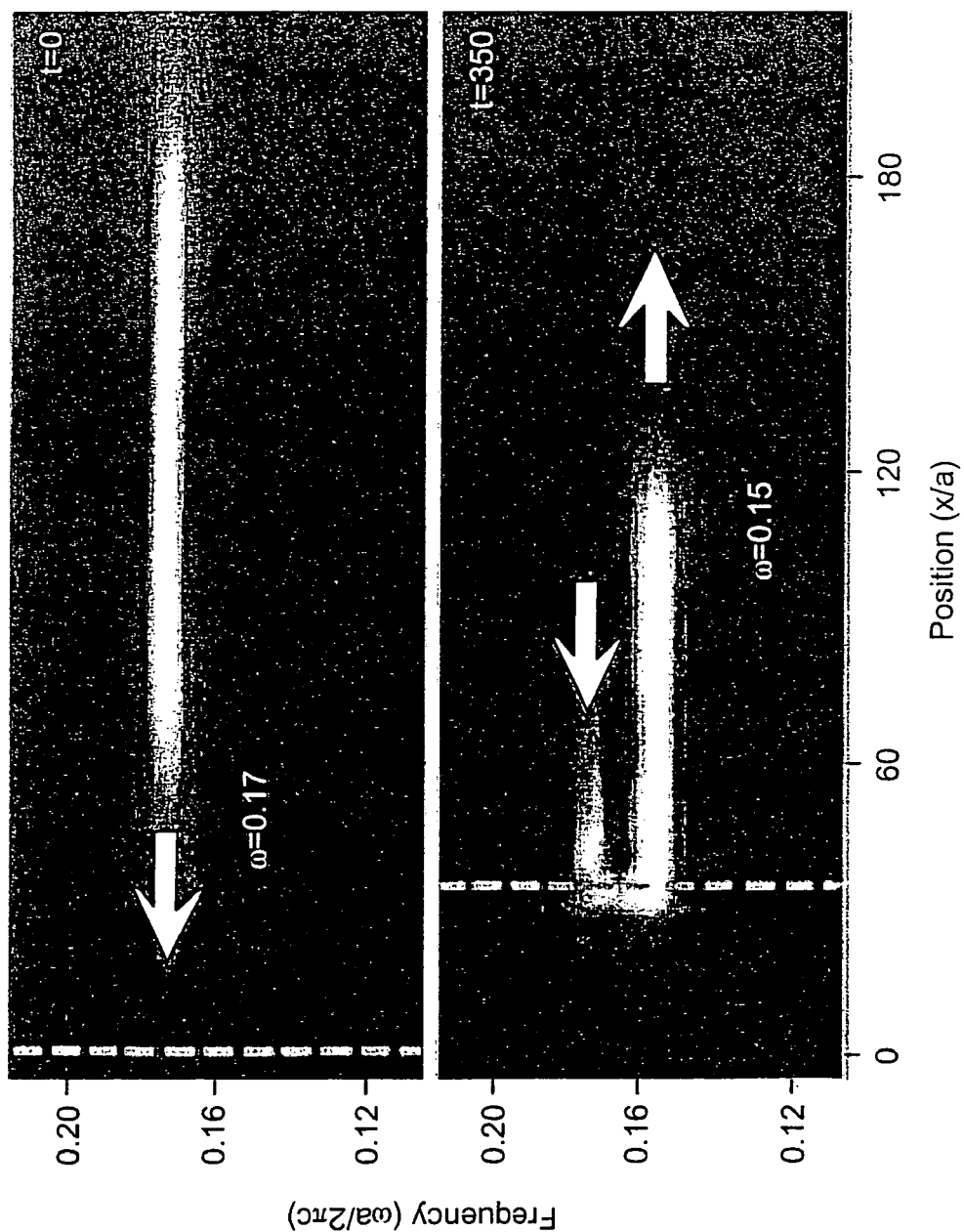
FIG. 11 shows the effect of this dielectric on a Gaussian pulse, which propagates toward the moving interface from the uniform dielectric region.

FIG. 11 shows the effect of this dielectric on a Gaussian pulse, which propagates toward the moving interface from the uniform dielectric region. The light is at a frequency where it is completely reflected by the bandgap region of the crystal, and a negative Doppler shift is observed. Here, $\gamma^{-1} = 1.8$, and $v = 0.125$ c. A similar simulation was performed for a Gaussian pulse around $\omega = 0.19$, in which a zero Doppler shift was observed. A positive Doppler shift was observed for incident frequencies between about 0.19 and the top of the reflecting bandgap.

Figure 12:
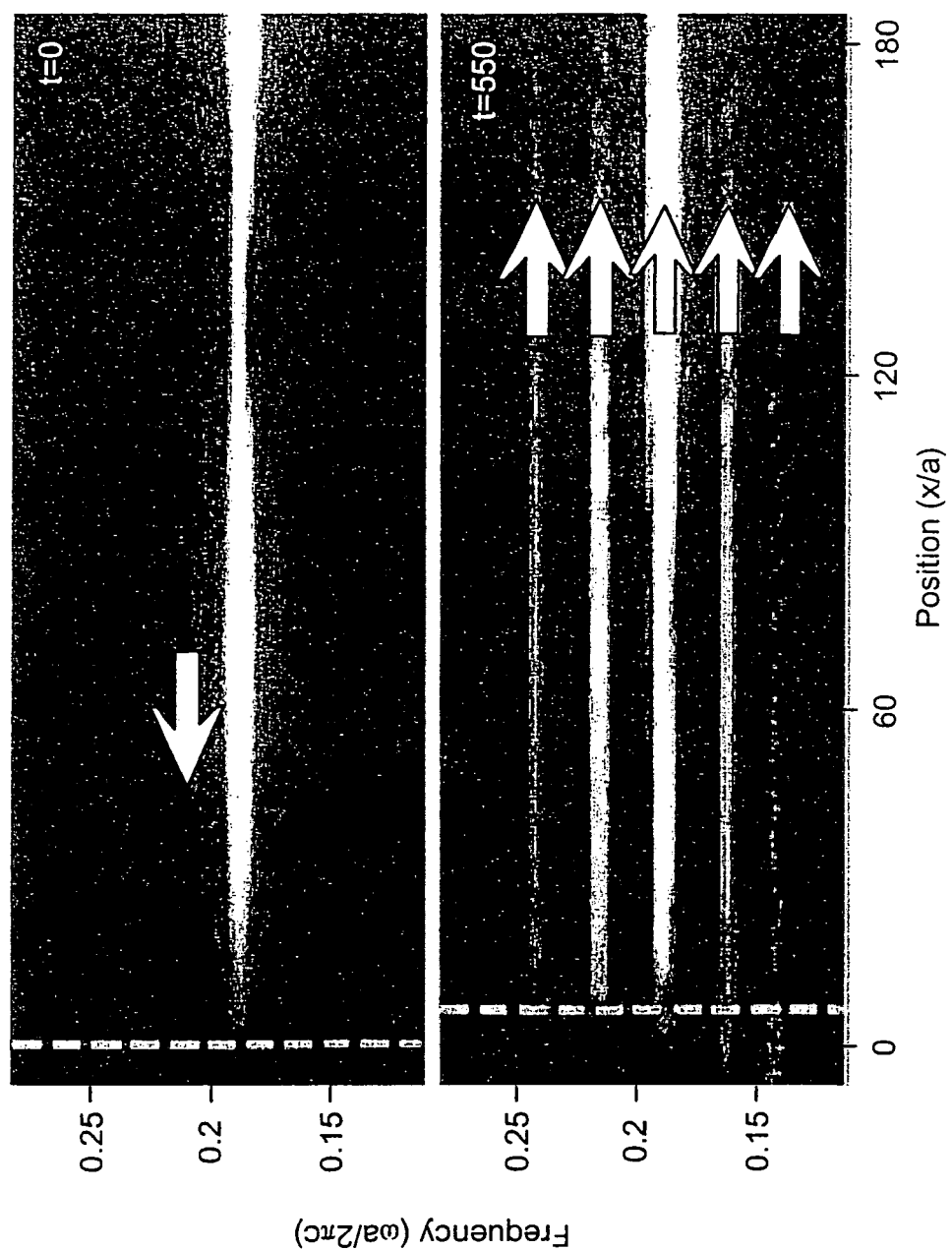
FIG. 12 illustrates how light of a single frequency is split into multiple discrete frequencies.

It is also possible to make light of a single frequency split into multiple discrete frequencies. This is illustrated in FIG. 12. This simulation is similar to that in FIG. 11 except the dielectric in the crystal region has additional high spatial frequency components. The dielectric is $$\varepsilon\left(\hat{x} = \frac{x}{a}, \hat{t} = \frac{ct}{a}\right) = \quad (3)$$
$$7 + 3\left[1 - \tanh\left(\gamma\left(\hat{x} - \frac{v}{c}\hat{t}\right)\right)\right]\left[\frac{4}{5}\sin(2\pi\hat{x}) + \frac{1}{10}\sin(4\pi\hat{x}) + \frac{1}{10}\sin(6\pi\hat{x})\right]$$

with shock front thickness parameter, $\gamma^{-1} = 0.013$ and $v = 0.025$ c.

The Gaussian pulse incident from the right in FIG. 11 is split into evenly spaced frequencies upon reflection. Some of the light is reflected with no frequency shift. The intensity of each of the reflected frequency components can be controlled by adjusting the form of the dielectric in the crystal region. As in the cases of FIGS. 3 and 4, the interpretation of the reflected light as evenly-spaced discrete frequencies or as a periodic modulation of a single frequency is a matter of experimental timescale resolution.

The phenomena observed in FIGS. 3 and 4 can be largely understood by considering the time-evolution of the various allowed modes as the shock propagates. Each time the shock wave propagates through one lattice unit, the crystal on the right in FIG. 2 is reduced in length by one lattice unit and the crystal on the left is increased by one lattice unit. Since the number of allowed values of k in a band is equal to the number of lattice periods in the crystal (ignoring polarization degeneracy) each time the shock wave passes over one lattice unit, the number of states in each band in the pre-shocked crystal must decrease by one and increase by one in the post-shocked crystal. This transfer process is indicated by the mode movement arrows in FIG. 2 for the lowest two bands. It should be noted that to accomplish this in the case of the second band, it is necessary for a mode to move up through the overlapping gap formed by the second bandgap in the preshocked region and the first bandgap in the postshocked region.

Indeed, the large frequency changes in FIGS. 3 and 4 are a direct result of the adiabatic evolution of the light through this overlapping bandgap. The light is essentially trapped in a cavity which is "squeezed" as the shock compresses the lattice, thereby increasing the frequency. This occurs once each time the shock propagates through a lattice unit.

While a significant change in the frequency of electromagnetic radiation through mechanical means usually requires the interaction with objects that are moving at a significant fraction of the speed of light, the adiabatic approach does not have this requirement. The adiabatic nature of the evolution of the radiation up in frequency through the total system bandgap has the property that it can be arbitrarily slowly completed with the same large shifts in frequency. This key physical mechanism liberates the shocked photonic crystal from the impossible task of interface propagation near the speed of light. Finally, it should be noted that a time-reversed, frequency lowering effect also occurs in this adiabatic picture.

The adiabatic picture is valid as long as the scattering processes involved with the incident light reflecting from the shock wave do not introduce frequency components that are significantly outside the original input pulse bandwidth. Therefore, the more time the incident light spends interacting with the shock front, the more likely it is for this condition to hold. This condition is satisfied for the systems exemplified in FIGS. 3 and 5, mostly satisfied for the system shown in FIG. 4, and completely invalid for the systems in FIGS. 11 and 12.

To develop a non-adiabatic theory, a scenario is provided where the incident light is at a frequency that falls within the gap of the compressed crystal. However, the systems depicted in FIGS. 1 and 10 must be treated slightly differently. Let us begin with the case in FIG. 1.

Far away from the shock front, the electric field in the pre-shocked photonic crystal is given by $$E(x,t) = E_0 e^{ikx} w_{k,n}(x) e^{-i\omega t}, \quad (4)$$

where k and n denote the translational and band indices, and $w_{k,n}(x)$ has the periodicity of the lattice, $w_{k,n}(x+a) = w_{k,n}(x)$.

Since the frequency of the incident light lies within the bandgap of the compressed photonic crystal, an effective model of the shock front is a mirror with a space-dependent E field reflection coefficient, $R(x)$, where x is the mirror position. R has the property that $|R(x)|=1$, since the incident light reflects from the bandgap of the post-shocked crystal. In general, R has some frequency dependence, but the bandwidth of the incident light is considered sufficiently small to neglect it. If the shock front is stationary, the boundary condition in terms of incident and reflected light is $$E_I e^{ik_I x} w_{k_I,n}(x) e^{-i\omega_I t} = E_0 R(x) e^{ik_0 x} w_{k_0,n}(x) e^{-i\omega_0 t}, \quad (5)$$

where $k_o$ and $k_I$ correspond to the incident and reflected states, respectively, and $E_0$ and $E_I$ are constants.

For light near the band edge at k=0, the frequency has the form $\omega = \omega_0 + \alpha k^2$. This substitution can be made without loss of generality because the condition near any band edge can be obtained by considering $k \to k - k_{edge}$ and a redefinition of the function $w_{k,n}(x)$. If an assumption is made that the shock is moving sufficiently slowly that the reflected light has the form of a single Bloch state, then a substitution can be made, $x \to x_o - vt$, to obtain a relation for the boundary condition at the shock front. This gives $$\frac{E_I(t)}{E_0} = e^{i(\alpha k_I^2 - \alpha k_0^2)t} e^{-i(k_I - k_0)(x_0 - vt)} R(x_0 - vt) \left( \frac{w_{k_0,n}(x_0 - vt)}{w_{k_I,n}(x_0 - vt)} \right), \quad (6)$$

where $E_I(t)$ now has some amplitude time-dependence due to the term in brackets.

It can be shown that, near a band edge where k is small, $$w_{k,n}(x) \approx i k u_n(x) + \frac{d}{dx} u_n(x) \quad (7)$$

where $u_n(x)$ has the periodicity of the lattice and is independent of k. Equation (6) can be further simplified by noting that when $$k_1 u_{k_1,n}(x_0 - vt) \ll \frac{d}{dx} u_{k_1,n}(x_0 - vt),$$

and, likewise for $k_o$, the term in brackets in Equation 6 is unity, and $E_I(t)$ is time-independent. Since small k is near the Brillouin zone center, this should be the case most of the time. If $R(x) = -1$ as for a metallic mirror, the time-dependence of Equation 6 must satisfy, $$\alpha k_I^2 - \alpha k_0^2 + (k_I - k_0)v = 0. \quad (8)$$

This gives a frequency shift of $$\omega_1 - \omega_0 = \frac{v^2}{\alpha} + 2vk_0 = \frac{v(v + v_{g,0})}{\alpha}. \quad (9)$$

The last relation is given in terms of the group velocity defined by $$v_g = \frac{d\omega}{dk} = 2\alpha k.$$

The relation between incident and reflected group velocities can be expressed as $v_{g,I} = -2v - v_{g,o}$. If $v<0$ and $v_{g,o}<0$, the mirror is moving to the right and incident light propagates to the left.

There are two remarkable features of Equation 9. The first is that, in the slow velocity limit where $$|2vk_0| \gg \left|\frac{v^2}{\alpha}\right|,$$

the Doppler shift $2vk_o$ is much smaller in magnitude than the usual vacuum Doppler shift $$2v\left(k_0 - \frac{2\pi}{a}\right) \text{ because } k_0 \ll \frac{2\pi}{a}$$

near the Brillouin zone center. The second notable feature is that for v<0, above the bandgap where α>0 the Doppler shift is positive, whereas below the bandgap where α>0, the Doppler shift is negative. Therefore, incident light is Doppler shifted away from the bandgap region on both sides of the bandgap.

It is interesting to note that the term in brackets in Equation (6) changes phase slowly except when $$\frac{d}{dx}u_n(x_0 - vt) \approx k u_n(x_0 - vt),$$

when the phase can change very rapidly. This indicates that the reflected frequencies are very sensitive to the position of the reflector in these special regions for light where $$|k| \ll \frac{2\pi}{a}.$$

This property could be useful in resolving the motion of objects which have oscillation amplitudes much smaller than the wavelength of the light they are reflecting, or for mechanical modulation of optical signals.

Considering the case of FIG. 10 where the pre-shocked material is completely uniform; light in the uniform region that reflects from the photonic crystal region can be endowed with an anomalous Doppler shift, as in FIG. 11, and be split into multiple frequencies, as in FIG. 12.

It should be noted that it is not possible to observe these effects by simply translating a photonic crystal through a uniform medium because the reflection coefficient for the photonic crystal in that case is constant, as in the case of a metal mirror. The new key physical phenomena that appear in this section result from the fact that the photonic crystal region "grows" into the uniform region, and not merely translates.

As a simple description of the phenomena in FIGS. 11 and 12, the photonic crystal boundary is represented as a space-dependent reflection coefficient. The reflected light can be expanded in the plane wave solutions of the uniform medium, $$\sum_{j>0} E_j e^{-i(\omega_j t - k_j x)} = R(x) E_0 e^{-i(\omega_0 t - k_0 x)}, \tag{10}$$

where R(x) can be written $R(x) = \Sigma_G \beta_G e^{-iGx}$ which is the most general form with the property R(x)=R(x+a). The reciprocal lattice vectors G are $$\frac{2\pi q}{a},$$

where q is an integer. This substitution and letting $x \to x_0 - vt$ yield a relation required by the time dependence of Equation (10) of, $$\omega_G + k_G v = \omega_0 + k_0 v - Gv \tag{11}$$

where the j index has been replaced with the reciprocal lattice vector index G. The reflected frequencies in the non-relativistic limit are, $$\omega_G - \omega_0 = (2k - G)v. \tag{12}$$

The reflected light has frequency components that differ from the usual Doppler shift by the amount Gv. For light near the first bandgap frequency, Gv is on the order of or larger than the Doppler shift from a metal mirror. The amplitude of each of these components is, $$|E_G| = |\beta_G||E_0|. \tag{13}$$

The reverse Doppler shift scenario in FIG. 11 corresponds to the case where the only dominant component of $R(x) = \Sigma^G \beta_G e^{-iGx}$ is the one corresponding to $$G = -\frac{2\pi}{a}.$$

Equation (12) indicates that the reflected light should have a single frequency with a negative shift if v<0, $k_o$<0, and $$||2k_0| < \frac{2\pi}{a},$$

which is the case in FIG. 11.

The multiple reflected frequencies of FIG. 12 are also represented by Equation 12. In this case R(x) has several spatial frequency components, which result from the high spatial frequency components in ε(x) for the crystal given by Equation 3. Furthermore, the incident light in the simulation in FIG. 12 has wavevector $$2k_0 = -\frac{2\pi}{a},$$

which is coincident with a value of G for the crystal. Therefore, some of the reflected light has the same frequency as the incident light.

Equation (12) is based on the assumption of a very sharp shock front. FIG. 10 was produced with a relatively broad shock front width greater than a, which has the effect of suppressing multiple reflected frequencies.

Consider the non-adiabatic model associated with the scenario of FIG. 1. With the limit v→0, the non-adiabatic model reduces to the adiabatic limit and provides some new physical insight. As was previously discussed, the adiabatic limit is achievable by increasing the time the incident light spends interacting with the shock front. Therefore, the adiabatic limit is taken by considering the effect of repeated bounces of the light from the slowly moving reflector where each bounce is described by Equation (6). It is envisioned that the light bounces between the slowly moving reflector and a fixed reflector positioned a distance L>>a in the crystal. Let $R(x) \equiv e^{i\theta(x)}$, and let the term in brackets in Equation 6 be denoted by $e^{iP(x_0-vt)}$. Assigning unit magnitude for the term in brackets in Equation (6) is acceptable for all time in the limit of small v where $k_l \to k_o$. Then, the time dependence of Equation (6) requires, $$\alpha k_l^2 + k_l v = \alpha k_o^2 + k_0 v + \theta'(x_0 - vt_0) \, v + P'(x_0 - vt_0) v, \quad (14)$$

where θ and P have been linearized about $t_0$, which is valid in the limit v→0. Primes denote derivatives. Then, after p bounces off the light between the stationary and moving reflectors, $$\alpha k_p^2 + k_p v = \qquad (15)$$

$$\alpha k_0^2 + k_0 v - \sum_{j=1}^{p-1} 2k_j v + \sum_{j=0}^{p-1} (\theta'(x_0 - vt_j) v + P'(x_0 - vt_j) v).$$

The number of bounces of the light p that occur during a time a/v when the reflector moves through one lattice constant is $$p = \frac{a v_g}{2Lv}.$$

The variation of $v_g$ over this time can be neglected in the limit L>>a.

Taking the limits v→0 (p→∞) and L<<a give, $$\alpha k_\infty^2 = \alpha k_0^2 + \frac{v_g}{2L} \int_0^a (\theta'(x_0 + x) + P'(x_0 + x)) \, dx. \quad (16)$$

The periodicity of the crystal gives the property that $\theta(x+\alpha) - \theta(x) = 2\pi l$, and the periodicity of $w_{k,n}$ gives the property that $P(x+\alpha) - P(x) = 2\pi m$, where l and m are integers. This substitution and some simplification gives the final result for the adiabatic change in k during the propagation of the shock over one lattice constant, $$\Delta k = \frac{\pi(l+m)}{L}. \quad (17)$$

The integer m is related to the particular bandgap around which $w_{k,n}$ describes states. It can be shown that for a sinusoidal dielectric, m=−1 above and below the first bandgap, m=−2 above and below the second bandgap, and so on. The integer l is also related to the particular bandgap from which light is reflecting. For a sinusoidal dielectric, l=1 for the first bandgap, l=2 for the second, and so on for the higher bandgaps. While quantum numbers are preserved in an adiabatic evolution, the k values referred to here change during an adiabatic evolution because they are convenient labels, not quantum numbers.

When Equation (17) is applied to the scenario in FIG. 2, l+m=1−2=−1, which indicates that the k quantum number of light will adiabatically decrease one k quantum for each lattice constant the shock wave moves. This is consistent with the adiabatic picture presented above which shows that one mode of the system must move up through the total system gap per lattice unit the shock traverses in FIG. 2. Furthermore, the invariance of the adiabatic picture to the details of crystal structure provides a general proof that the above statements about m and l hold for all crystals.

Another interesting case is when the shock interface separates two crystals of differing bandgap sizes such that light near the first bandgap in the pre-shocked crystal reflects from the first bandgap of the post-shocked crystal. In this case, l+m=1−1=0, indicating there is no net Doppler shift for small shock velocities. This absence has been observed in FDTD simulations.

While there are numerous ways to increase the bandwidth of a wave packet, there are, to our knowledge, currently no non-quantum mechanical ways to decrease the bandwidth. An important implication of this adiabatic evolution of light is that the bandwidth of a pulse of light can be modified in a controlled fashion while bouncing between the moving shock wave and a fixed reflecting surface, as in FIG. 5. Equation (17) indicates the width of a wavepacket in crystal momentum space δk should be preserved after many bounces because every k state moves by the same amount. The dispersion relation near a band edge indicates the bandwidth δω for a wavepacket of width δk is a function of k near the band edge, δω=2αkδk. Therefore, the bandwidth of a pulse will be altered as it evolves through k-space during the bouncing. This fact enables the compression of the bandwidth of a pulse of light to a vanishing amount in the limits of a large separation between the two reflecting surfaces and slowly moving shock front.

In FIG. 5, a wavepacket of mean wavevector k is shifted up in frequency toward the band edge, causing the bandwidth to decrease. The bandwidth is modified without a very large change in average frequency. However, if the wavepacket reaches the band edge, it will be trapped at the shock front and converted up in frequency until it is expelled at the frequency of the top of the bandgap. In this case, there is a large average frequency shift in addition to a narrowing in bandwidth. Both of these effects may have useful applications.

These new technologies have a wide variety of possible applications. The ability to change the frequency of electromagnetic radiation over a wide frequency range (typically 20% or more) with high efficiency is of significant value in the telecommunications industry. This industry utilizes a frequency range of about 3%.

The capacity to delay a pulse of light for an amount of time which is determined while delaying has applications in the telecommunications industry. The capacity to reorder portions of optical signals can also have applications in the telecommunications industry.

The capacity to convert a relatively broad bandwidth of frequencies to a nearly single frequency may have applications for the harnessing of solar energy. Current solar cells do not have the capacity to harness all frequency regions of the solar spectrum with high efficiency. A material with an electronic optical bandgap of a given frequency must be fabricated to harness the solar energy in the region of that frequency. Fabrication of such materials is currently not possible for the entire solar spectrum. The devices presented here allow the conversion of parts of the solar spectrum which may not be utilized by solar cells to a frequency which is efficiently converted to electricity. It is envisioned that this results in considerable increases in efficiency of solar cells.

The perfect absorption of a portion of the electromagnetic spectrum using these devices may be suited to applications where electromagnetic absorption is important.

Some of the new physical phenomena presented in this paper are most pronounced for light close to the edge of a bandgap where group velocities are small. Group velocities two orders of magnitude less than that in air have been experimentally realized in photonic crystals.

The generalized shock-like profiles of the dielectric discussed here could be generated by a variety of means. Materials which undergo a change in the dielectric constant under an applied electric field or applied change in temperature are promising candidates. Such an approach might make possible the control of the shock velocity and shock front thickness through time-dependent control of the local dielectric at all points in the system. It is also possible to launch a physical shock wave into the photonic crystal using explosive loading, high-intensity lasers, or other means. The phenomena in FIGS. 11 and 12 should be observable using this approach. Although large compressions are used to illustrate the phenomena in FIGS. 3 and 4, it should be noted that it is possible to observe the same phenomena with compressions of a few percent or less by considering the use of deliberately designed defect bands or overlapping bandgaps formed by higher frequency bandgaps in the pre- and post-shocked crystals.

Additionally, although this disclosure describes shock-like dielectric modulations, the observed phenomena can be observed in two and three dimensions and using other types of dielectric modulation. MEMS devices provide an avenue for the generation of time-dependent effects in photonic crystals. For example, the adiabatic transfer of light between the bottom and top of a bandgap may be accomplished by varying the air spacing between two photonic crystals of differing lattice constants in an oscillatory fashion. As another example, consider a rotating disk containing a spiral photonic crystal pattern. Small millimeter diameter MEMS disks have been made to rotate at millions of RPM in microengines. Light reflecting from the edge of such a disk will see a dielectric modulation identical to that of FIG. 10 as viewed in a reference frame where the shock front is stationary. Hence, various embodiments are envisioned using variations on this approach. Finally, small time-dependent changes in the dielectric can also be generated using non-linear materials. As examples of specific applications, an optical switch based on the present invention and a method for electromagnetic wave modulation and control through time-dependent photonic crystals are described below.

Figure 13:
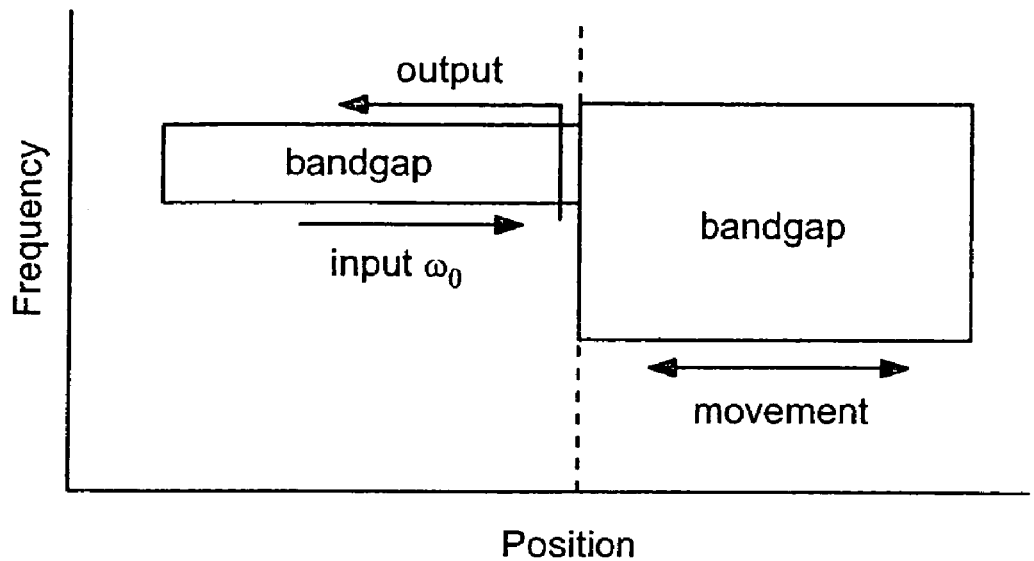
FIG. 13 illustrates a device comprising two different photonic crystals which shifts light upwards in frequency.
Figure 14:
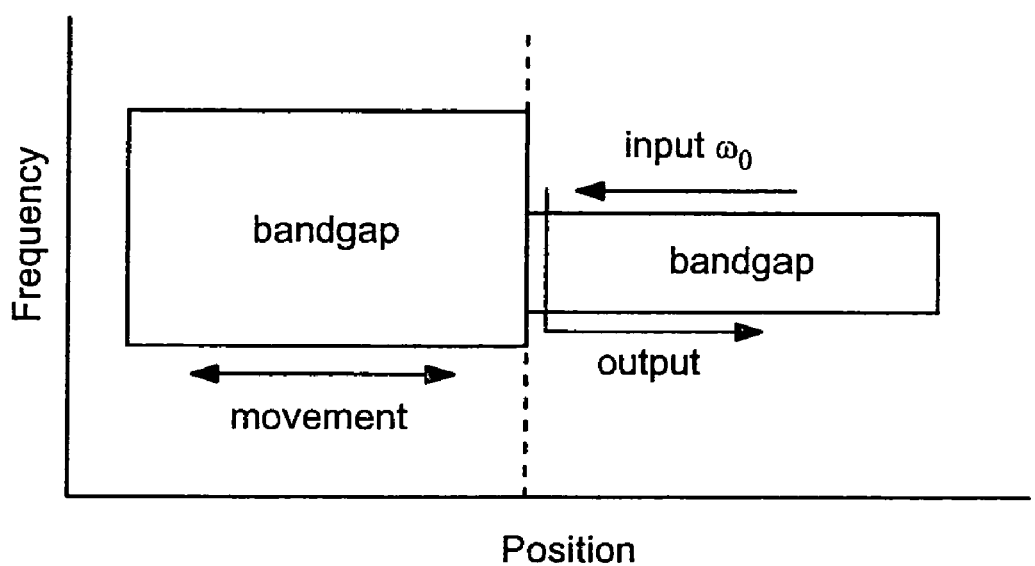
FIG. 14 illustrates a device which shifts light down in frequency, wherein the device is designed so that the light does work on the photonic crystal on the right.

FIG. 13 illustrates a device comprising two different photonic crystals which shifts light upwards in frequency. FIG. 14 illustrates a device which shifts light down in frequency, wherein the device is designed so that the light does work on the photonic crystal on the right. If the photonic crystal on the right acts like an oscillation in position, energy is transferred to this oscillator as the conversion process proceeds. In principle, this energy can be extracted through the use of piezoelectric materials or other means.

While the force felt by a reflecting surface reflecting a beam of light is ordinarily very small, this force is enhanced by many orders of magnitude in devices utilizing the teachings of the present invention. It is estimated that the forces supplied by light are of sufficient magnitude to displace a typical MEMS device on the order of 10% of the wavelength of 1.55 µm light for intensities in the 10 milliwatt range. This allows for the possibility to control the geometry of MEMS devices with light.

Figure 15:
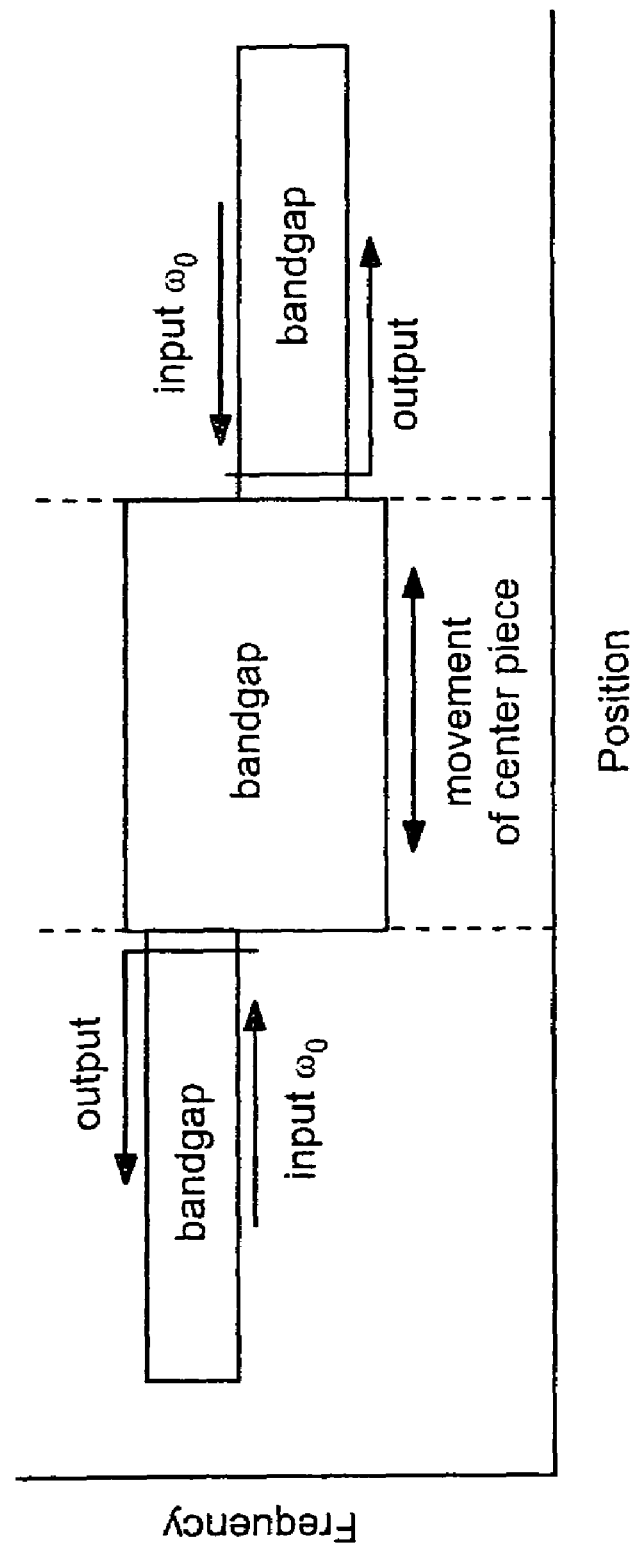
FIG. 15 represents a combination of the devices of FIGS. 13 and 14.

FIG. 15 represents a combination of FIGS. 13 and 14. Light of frequency $\omega_0$ is shined into the system from right and left. When the center photonic crystal moves to the left, the light on the right is shifted down in frequency and the light on the left is shifted up in frequency. The system is designed so that the force supplied by the light on the right is greater than the force on the left. As a consequence of this, more energy must be extracted from the light which is shifted down than put into the light which is shifted up if the right and left inputs are of the same intensity. If the center crystal is mounted on an effective spring, it will return to and past its original position and the conversion process will begin again.

Figure 16:
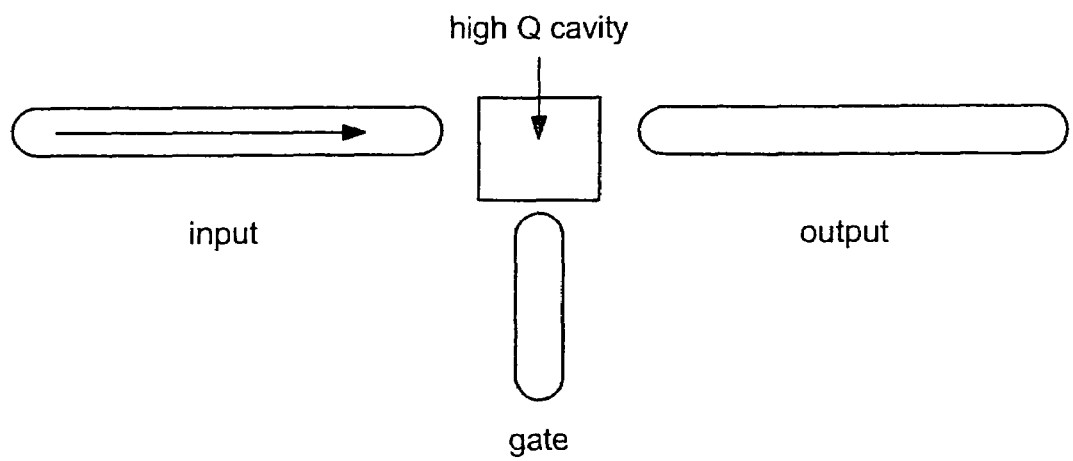
FIG. 16 gives a schematic of a possible all optical switch based on the present invention.
Figure 16:
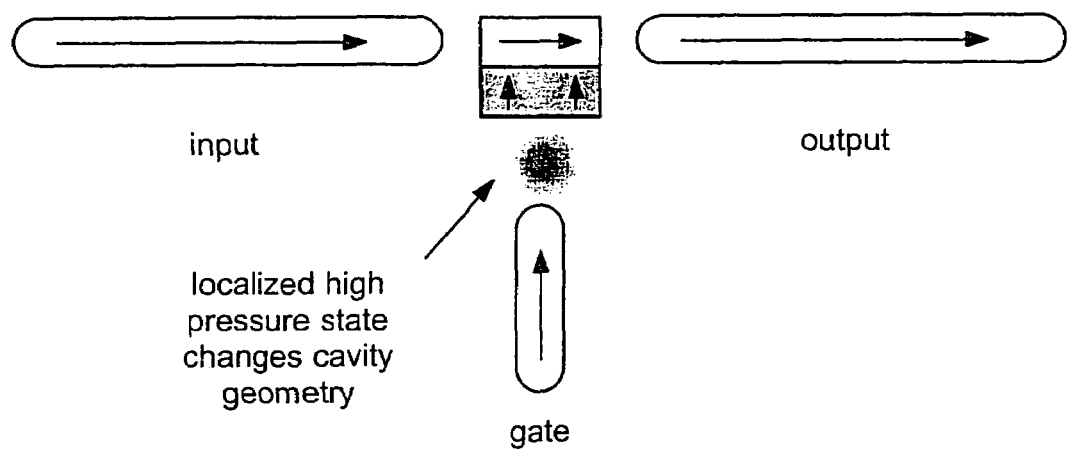

As a consequence of the ability to change the geometry of MEMS devices with light using our technology, an all optical switch can be produced. FIG. 16 gives a schematic of a possible all optical switch. The input and output waveguides are coupled with a high Q cavity. The resonant frequency of the cavity can be controlled by changing the geometry. If the resonant frequency is close to the frequency of the input light, resonant tunneling can occur and 100% transmission can be achieved. This has been previously demonstrated in photonic crystal systems.

If light which is shined into the gate waveguide gets trapped in a high-pressure state, the high Q cavity geometry may be altered. It is thus possible to turn the device on using only light. If the gate light source disappears, the device may still remain in the on configuration if light is still trapped in the high pressure state. The length of time the device stays in the on configuration will depend on the device design and the intensity of the initial gate pulse and the absorption coefficient of the photonic crystal material and the Q of the high pressure state.

Figure 17:
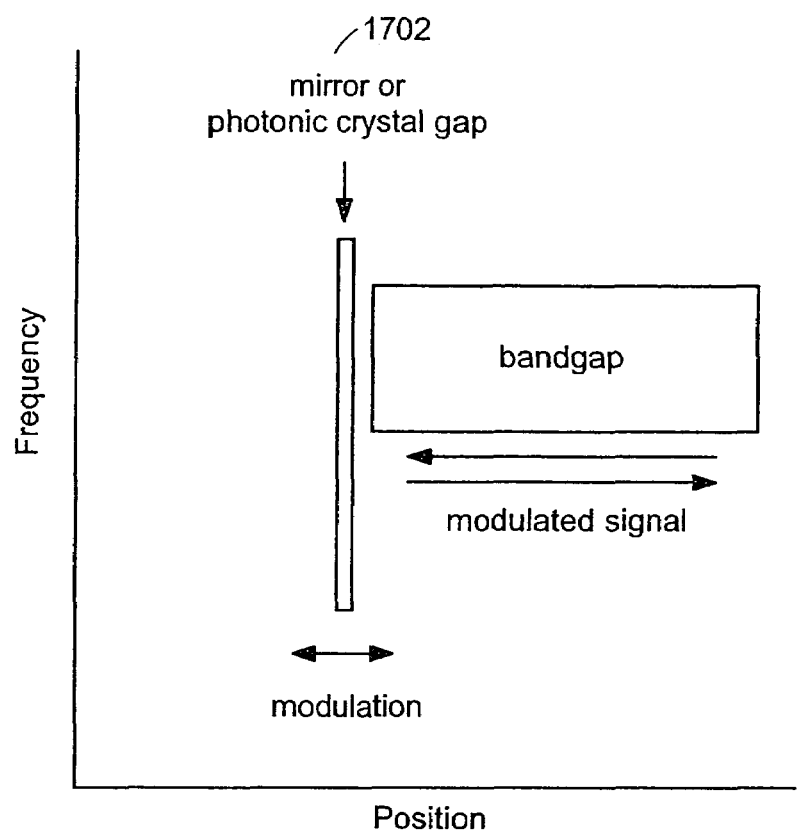
FIG. 17 illustrates the effects of a strategically placed moving reflecting surface in a photonic crystal on the electromagnetic radiation inside.

As mentioned above, another example as the present invention's application is a method for electromagnetic wave modulation and control through time-dependent photonic crystals. FIG. 17 illustrates the effects of a strategically placed moving reflecting surface in a photonic crystal on the electromagnetic radiation inside.

There exist special places in a photonic crystal near a band edge where the phase of reflected light is a strong function of the velocity of the reflecting surface. These special locations exist in the neighborhood of places where $dH/dx=0$, where H is the magnetic field. If a reflecting surface, such as a mirror or another photonic crystal, is moved in the vicinity of these locations, an unusually large frequency shift of the reflected light may be observed. The presence of extra frequencies in the reflected signal is a form of modulation.

Figure 18:
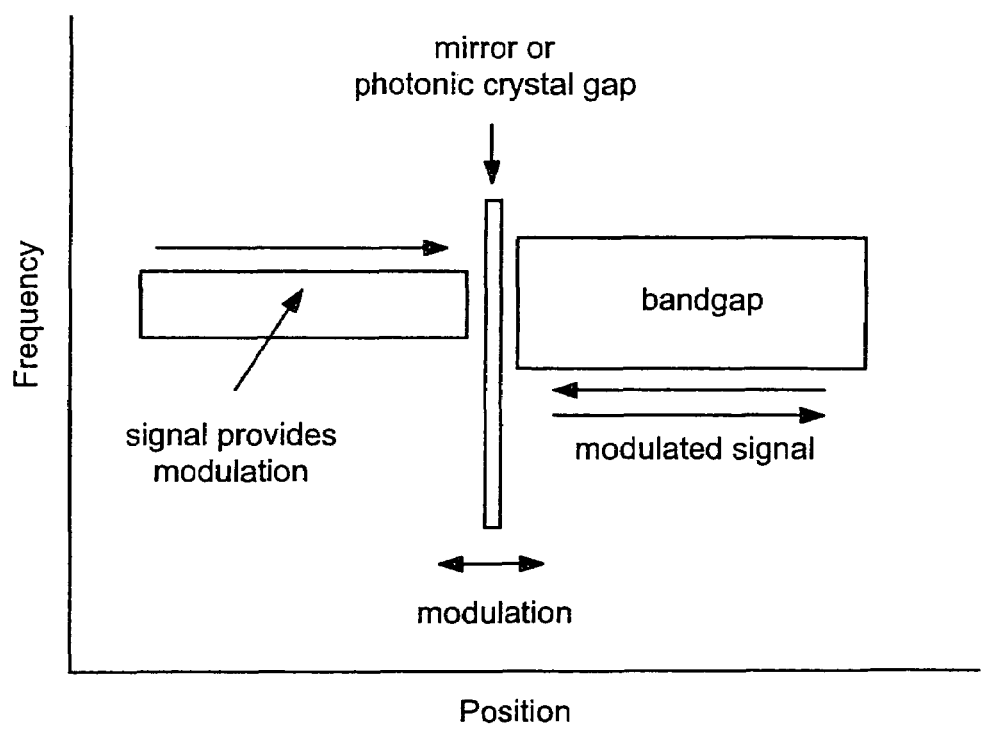
FIG. 18 presents a specific example of how a signal can be transferred from one wavelength to another using a thin reflecting film as an intermediary.

FIG. 17 presents a 1-dimensional schematic of the utilization of this phenomenon. As the mirror 1702 on the left moves, light incident from the right is modulated as it is reflected. Hence, light which is incident from the right at a frequency just below the bandgap in the photonic crystal is reflected from the mirror. If the mirror is moving, a large Doppler shift is observed in the reflected light. This frequency shift or broadening is a modulation of the reflected light. This device allows the resolution of changes in location of the mirror on the left much less than the wavelength of the light shined in from the right in FIG. 17. FIG. 18 presents a specific example of how a signal can be transferred from one wavelength to another using a thin reflecting film as an intermediary. A signal on the left modulates the displacement of the thin film which modulates the light of a different frequency on the right side. This scenario is identical to FIG. 17 with the exception of the electromagnetic signal incident from the left which can be a source of modulation of the reflecting surface through photon pressure. The device of FIG. 18 allows for modulating a signal with another of different frequency.

Applications which require resolution of reflecting objects which move length scales much less than the wavelength of the probe light can benefit from this technology. Miniaturized motion detectors for MEMS devices could be constructed. Additionally, this method of modulation is not bandwidth limited. The direct modulation of optical frequencies with signals that have a broad bandwidth can be accomplished using our invention. This can be very difficult to accomplish using electronics.

Hence, the present invention's devices allow the generation of an arbitrary frequency, which is tunable by adjusting the size of a bandgap. Generation of an arbitrary frequency through existing means is difficult and costly. The strong interaction of light and matter through the high pressure modes outlined here provides an alternating to nonlinear material effects which require high intensities and electronics which translate optical signals into mechanical effects. Frequency conversion can be accomplished through the present invention's devices without any supplied power or electronics. The perfect absorption of a portion of the electromagnetic spectrum using these devices may be suited to applications where electromagnetic absorption is important. The conversion of electromagnetic energy directly into mechanical energy may have applications in the solar power industry.

Figure 19:
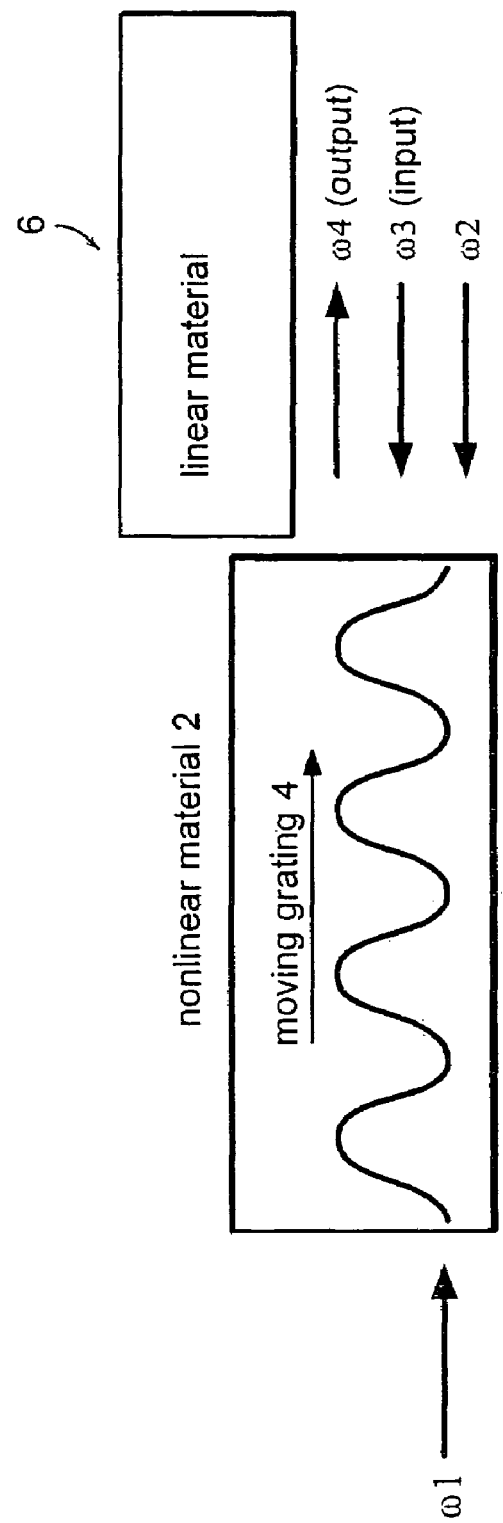
FIG. 19 is a schematic diagram of the invention using moving gratings.

FIG. 19 shows another approach in utilizing moving photonic crystals to achieve highly efficient frequency conversion of electromagnetic radiation. In particular, FIG. 19 shows a material 2 having a nonlinear dielectric response, and a material 6 having a linear response. Electromagnetic radiation of frequencies $\omega_1$ and $\omega_2$ are shined in opposite directions. This creates a moving periodic modulation or moving grating of the dielectric, or moving photonic crystal 4, within the nonlinear region. Electromagnetic radiation to be frequency converted is shined from the linear region at a frequency $\omega_3$. The frequencies $\omega_1$ and $\omega_2$ are chosen so that $\omega_3$ coincides with a bandgap frequency region of the moving photonic crystal in the nonlinear material. The input signal $\omega_3$ signal has an exponentially decaying spatial dependence into the nonlinear region and is reflected from the moving photonic crystal and propagates away to the right at frequency $\omega_4$.

Note $\omega_3$ falls within one of the bandgaps of the moving photonic crystal 4. The efficiency of this conversion in a phase matched system is 100% for light of bandwidths below the bandgap size of the moving photonic crystal, which can be about $10^{-3}\omega_0$ in practice. This method of frequency conversion can be performed on arbitrarily weak input signals. In addition to efficient frequency conversion, this technology may also have useful applications for quantum information processing due to the capability to manipulate low intensity signals combined with the preservation of signal bandwidth.

This embodiment of the invention is a special case of 4-wave mixing where the input signal exhibits an exponentially decaying spatial dependence in the nonlinear region.

Figure 20:
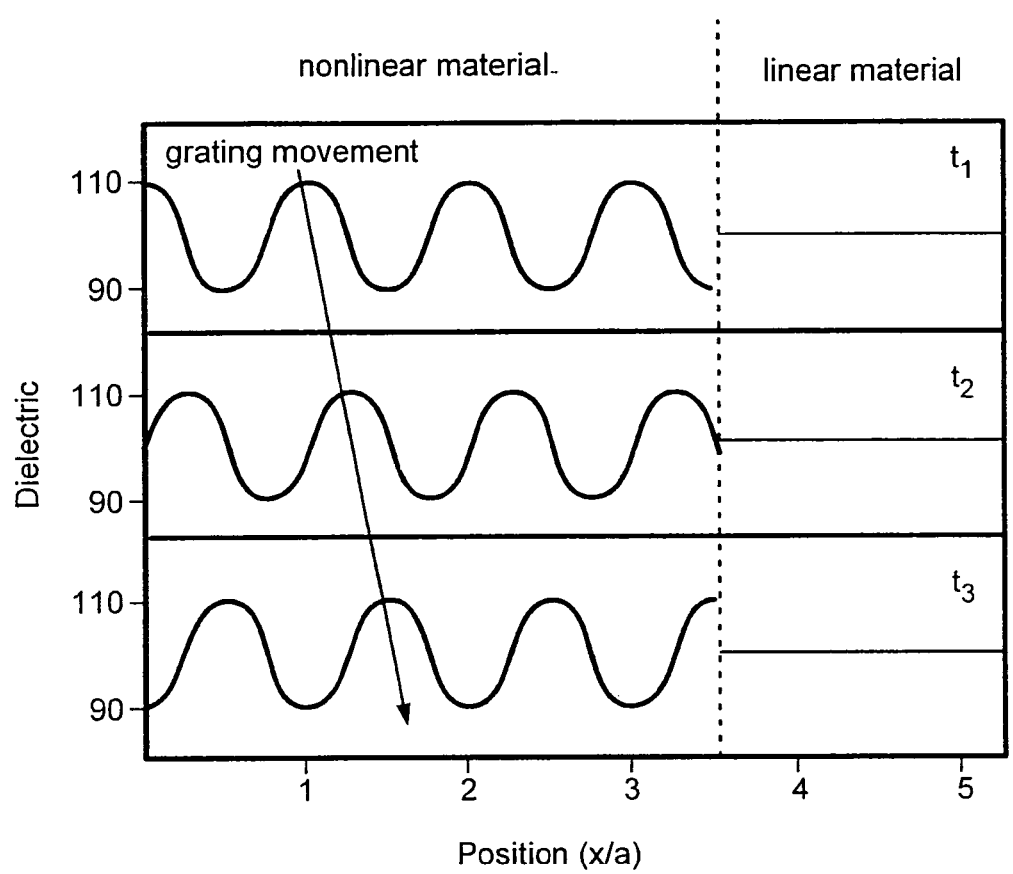
FIG. 20 is a time graph showing the movement of the moving gratings in a nonlinear material.

FIG. 20 shows the dielectric at three equally-spaced instants in time, $t_1 > t_2 > t_3$. The arrows show the movement of the photonic crystal 4 in the nonlinear material 2.

If the nonlinear material 2 utilized possesses a nonlinearity with a timescale fast enough to respond to the frequency $|\omega_1 - \omega_2|$ but slow enough to average over $\omega_1 + \omega_2$ then the interference of the pump beams $\omega_1$ and $\omega_2$ produces a grating of lattice constant.

$$a = \frac{2\pi c}{n(\omega_1 + \omega_2)} \qquad \text{Eq. 18}$$

with moving velocity $$v = \frac{c(\omega_1 - \omega_2)}{n(\omega_1 + \omega_2)}. \qquad \text{Eq. 19}$$

where n is the refractive index of the nonlinear material, assumed to be independent of frequency in this case. The input frequency $\omega_3$ must satisfy, $$\omega_3 \approx l\omega_2 \qquad \text{Eq. 20}$$

where l is a positive integer that corresponds to the particular bandgap from which the incident light reflects. This is an approximate relation because the photonic crystal bandgap has some non-zero width in frequency space. For this input frequency, the output frequency is, $$\omega_4 \approx l\omega_1 \qquad \text{Eq. 21}$$

The amount of frequency shift is given by $$\Delta\omega = \frac{2\pi v l}{a} = (\omega_1 - \omega_2)l. \qquad \text{Eq. 22}$$

When l=1 (input signal light reflects from the lowest frequency bandgap), the pump frequencies are equivalent to the input signal and output signal frequencies. The amount of frequency shift relative to the input frequency is given by, $$\frac{\Delta\omega}{\omega} = \frac{2n\frac{v}{c}}{1 - n\frac{v}{c}}. \qquad \text{Eq. 23}$$

Analytical theory predicts that there is only one reflected frequency in the limit of a narrow photonic crystal bandgap. This fact enables 100% efficiency in the conversion process. In practice, the small bandgap in the nonlinear material is well into the single reflected frequency regime.

The previous results were derived using Galilean relativity, which holds correct when v<<c. Relativistic effects can be derived and shown to result in the production of extra reflected frequency components.

Figure 21:
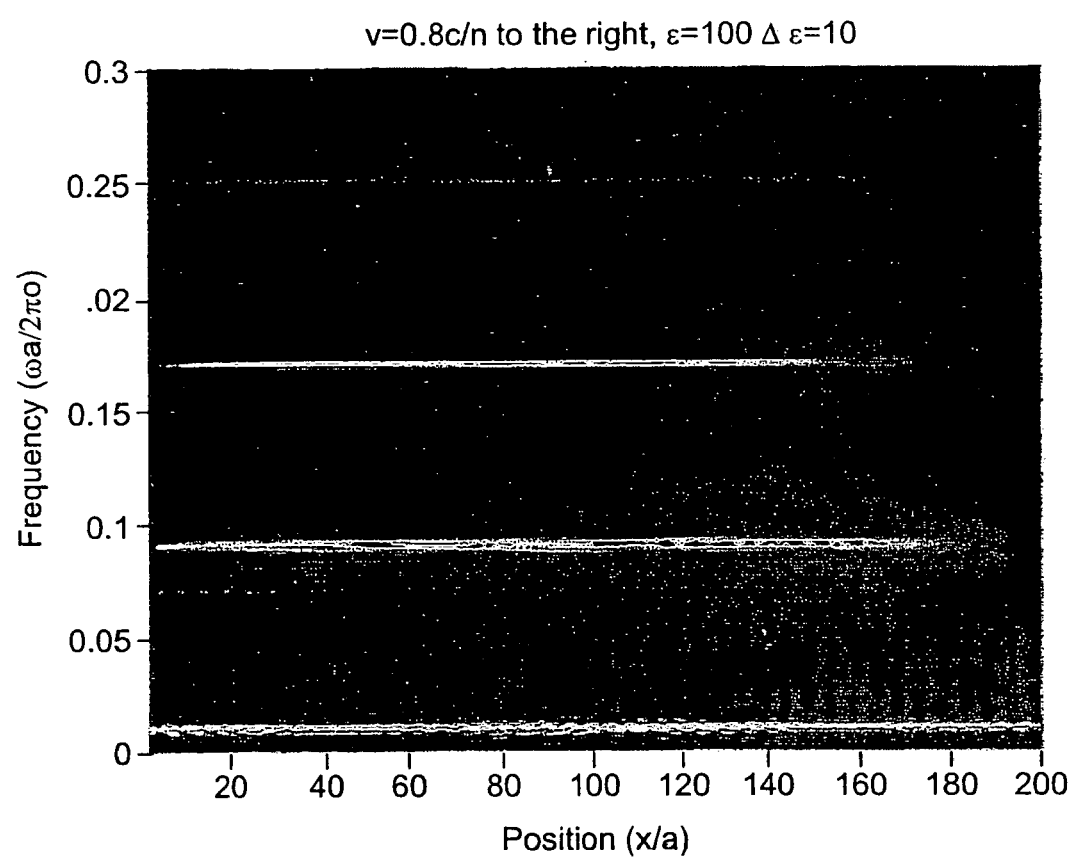
FIG. 21 is a graph demonstrating the operations of the invention.

FIG. 21 shows results of a computer simulation illustrating operation of the device. Light is incident to the left at frequency $\omega$=0.01. The linear-nonlinear interface is at x=30 a, where a is the lattice constant of the photonic crystal. Light is reflected from the interface and propagates to the right at multiple frequencies. The number of reflected frequencies will be 1 in the limit of a small photonic crystal bandgap, as will exist in practical setups. The simulations reported here utilize time-dependent modulations of the index in the nonlinear region, removing lo the need for the pump beams in the simulations. The simulations also possess perfect phase matching, i.e. the dielectric constant exhibits no frequency dependence.

Figure 22:
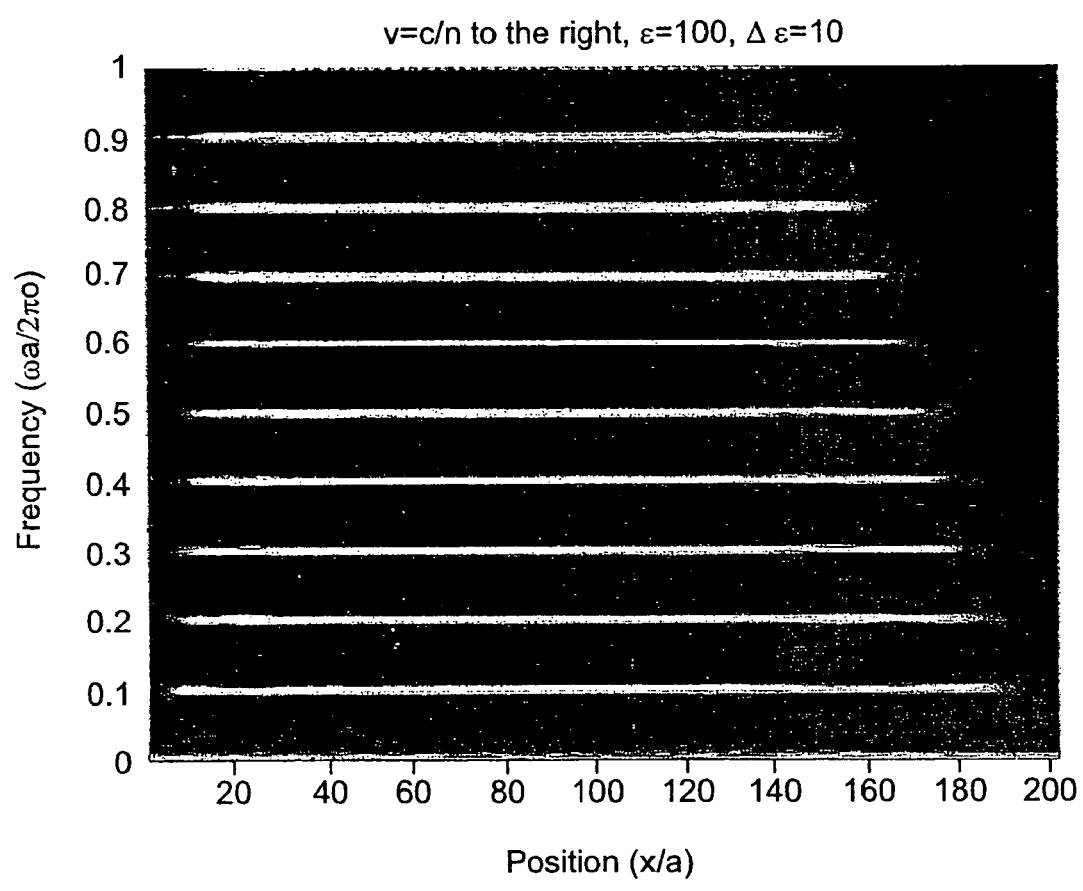
FIG. 22 is a simulation result illustrating a constant electric field applied in the linear region.

Under certain conditions, $\Delta\omega/\omega$ in Eq. 23 can be made infinite. In this case the input frequency is zero (i.e. a constant electric field). Computer simulation of this scenario is shown in FIG. 22. In FIG. 22, a constant electric field is applied in the linear region. This is upconverted to multiple equally spaced frequencies of similar intensity. Here the dielectric used is given in FIG. 20, and the velocity has been chosen to make the denominator of Eq. 23 is zero. Maximum frequency produced in this scenario is extremely sensitive to the bandwidth of the input signal in this case. It is also sensitive to the frequency dependence of the dielectric which can have an effect on the degree of phase matching.

This scenario requires the grating to be moving at the speed of light in the nonlinear material, so only one pump frequency $\omega_1$ is required in this case. A fast nonlinear response can be required to produce a periodic index modulation that is sufficiently fast to observe nonlinear effects in this case. Nonlinear response times on the femtosecond time scale exist in AiGaAs and other materials with a non-resonant excitation. This timescale is fast enough to observe the effects.

In this embodiment of the invention, it is described in 1D, but higher spatial dimensions can be exploited. For example, the input frequency $\omega_3$ can be shined on the linear-nonlinear interface at an angle. Since the bandgap frequency of the photonic crystal in the nonlinear material is a function of this angle, the angle can be varied to obtain high conversion efficiency rather than vary the frequencies of $\omega_1$ and/or $\omega_2$.

The bandwidth region where 100% frequency conversion is obtained depends on the power of the beams used to generate the moving grating in the nonlinear material. The typical bandwidth where 100% conversion efficiency can be obtained with the new approach can be up to $10^{-3}$ $\omega_0$, where $\omega_0$ is the average frequency to be converted. These bandwidths are determined by the degree of material nonlinearity and the intensity of the light used to generate the moving grating.

The exponentially decaying nature of the converted light within the photonic bandgap frequency region in the photonic crystal in FIG. 19 results in a small device. The localization length of light in the photonic crystal is typically between $10^3\lambda$ to $10^4\lambda$ where $\lambda$ is the wavelength of light to be converted. Some existing approaches to nonlinear frequency conversion require the use of kilometer lengths of fiber to obtain reasonable efficiencies. This exponentially decaying spatial dependence of light in the nonlinear region may also decrease the importance of any phase mismatches that can prevent efficient conversion.

Although the present invention has been shown and described with respect to several preferred embodiments thereof, various changes, omissions and additions to the form and detail thereof, may be made therein, without departing from the spirit and scope of the invention.

What is claimed is:

1. A method of modifying frequency of electromagnetic radiation input into a nonlinear medium comprising:
   a) forming a moving grating in said nonlinear medium by introducing at opposite ends of said nonlinear medium a first set of electromagnetic radiation having varying frequencies;
   b) inputting electromagnetic radiation into said nonlinear medium at a first frequency; and
   c) extracting electromagnetic radiation at a second frequency from said nonlinear medium;
      said moving grating in said nonlinear medium allowing for electromagnetic radiation to be modified into said second frequency.

2. The method of claim 1, wherein said electromagnetic radiation is light.

3. The method of claim 1, wherein said varying frequencies are chosen so that said first frequency coincides with a bandgap frequency region of the moving grating in said nonlinear medium.

4. The method of claim 1, wherein said input electromagnetic radiation comprises an exponentially decaying spatial dependence into said nonlinear medium.

5. The method of claim 1, wherein said input electromagnetic radiation is reflected from the moving grating and propagates away at said second frequency.

6. The method as per claim 1, wherein said input electromagnetic radiation falls within one of the bandgaps of the moving grating.

7. The method of claim 1, wherein said extracted electromagnetic radiation is phase matched with said inputted electromagnetic radiation for electromagnetic radiation of bandwidths below the bandgap size of said moving grating.

8. A method of converting frequency of electromagnetic radiation input into a nonlinear medium comprising:
   a. forming a moving grating in said nonlinear medium by introducing at opposite ends of said nonlinear medium a first set of electromagnetic radiation having varying frequencies;
   b. inputting electromagnetic radiation into said nonlinear medium at a first frequency; and
   c. extracting electromagnetic radiation at a second frequency from said nonlinear medium;
      said moving grating in said nonlinear medium allowing for electromagnetic radiation to be converted into said second frequency.

9. The method of claim 8, wherein said electromagnetic radiation is light.

10. The method of claim 8, wherein said varying frequencies are chosen so that said first frequency coincides with a bandgap frequency region of the moving grating in said nonlinear medium.

11. The method of claim 8, wherein said input electromagnetic radiation comprises an exponentially decaying spatial dependence into said nonlinear medium.

12. The method of claim 8, wherein said input electromagnetic radiation is reflected from the moving grating and propagates away at said second frequency.

13. The method as per claim 8, wherein said input electromagnetic radiation falls within one of the bandgaps of the moving grating.

14. The method of claim 8, wherein said extracted electromagnetic radiation is phase matched with said inputted electromagnetic radiation for electromagnetic radiation of bandwidths below the bandgap size of said moving grating.

15. A device for converting frequency of electromagnetic radiation comprising a nonlinear medium that forms a moving grating in said nonlinear medium by introducing at opposite ends of said nonlinear medium a first set of electromagnetic radiation having varying frequencies, electromagnetic radiation is inputted into said nonlinear medium at a first frequency and extracted at a second frequency from said nonlinear medium, said moving grating in said nonlinear medium allowing for electromagnetic radiation to be converted into said second frequency.

16. The device of claim 15, wherein said electromagnetic radiation is light.

17. The device of claim 15, wherein said varying frequencies are chosen so that said first frequency coincides with a bandgap frequency region of the moving grating in said nonlinear medium.

18. The device of claim 15, wherein said input electromagnetic radiation comprises an exponentially decaying spatial dependence into said nonlinear medium.

19. The device of claim 15, wherein said input electromagnetic radiation is reflected from the moving grating and propagates away at said second frequency.

20. The device of claim 15, wherein said input electromagnetic radiation falls within one of the bandgaps of the moving grating.

21. The device of claim 15, wherein said extracted electromagnetic radiation is phase matched with said inputted electromagnetic radiation for electromagnetic radiation of bandwidths below the bandgap size of said moving grating.

* * * * *